US011715121B2

United States Patent
Ni et al.

(10) Patent No.: US 11,715,121 B2
(45) Date of Patent: Aug. 1, 2023

(54) COMPUTER SYSTEM AND METHOD FOR ELECTRONIC SURVEY PROGRAMMING

(71) Applicant: Schlesinger Group Limited, Iselin, NJ (US)

(72) Inventors: Sheng Yan Ni, Toronto (CA); Daniel Thomas, Toronto (CA); Shayne Quinton, Toronto (CA); Leo Hok Lai Pang, Toronto (CA)

(73) Assignee: Schlesinger Group Limited, Iselin, NJ (US)

( * ) Notice: Subject to any disclaimer, the term of this patent is extended or adjusted under 35 U.S.C. 154(b) by 16 days.

(21) Appl. No.: 16/807,287

(22) Filed: Mar. 3, 2020

(65) Prior Publication Data
US 2020/0342471 A1     Oct. 29, 2020

Related U.S. Application Data

(60) Provisional application No. 62/838,397, filed on Apr. 25, 2019.

(51) Int. Cl.
*G06Q 30/0203* (2023.01)

(52) U.S. Cl.
CPC ................. *G06Q 30/0203* (2013.01)

(58) Field of Classification Search
CPC ............... G06Q 30/0203; G06F 17/18
(Continued)

(56) References Cited

U.S. PATENT DOCUMENTS 6,901,424 B1   5/2005  Winn
7,941,092 B2   5/2011  Rao
(Continued)

FOREIGN PATENT DOCUMENTS

CA     2725075 A1    11/2009
WO  2018151781 A1    8/2018

OTHER PUBLICATIONS

InsideClipboard, https://web.archive.org/web/20180405065723/https://www.nirsoft.net/utils/inside_clipboard.html, Apr. 5, 2018 (Year: 2018).*

(Continued)

*Primary Examiner* — Charles Guiliano
*Assistant Examiner* — Po Han Lee
(74) *Attorney, Agent, or Firm* — Phillips Lytle LLP; David L. Principe

(57) ABSTRACT

A computer system for performing automated market research using an electronic survey is provided herein. The computer system includes a communications subsystem for receiving survey content data. The communications subsystem also receives survey response data from at least one respondent device. The computer system includes a memory for storing the survey content data and the survey response data. The computer system includes a processor configured to execute a survey programming application. The survey programming application includes a survey design application for creating a survey program from the survey content data. The survey program provisions the electronic survey to respondents via the at least one respondent device and collects the survey response data from the respondents. The survey programming application also includes at least one survey program quality assurance tool. The survey program quality assurance tool interfaces with the survey design application and performs a survey program quality assurance function.

16 Claims, 18 Drawing Sheets

(58) Field of Classification Search
USPC .................................................. 705/7.32
See application file for complete search history.

(56) References Cited

U.S. PATENT DOCUMENTS

| | | | |
|---|---|---|---|
| 7,983,611 B2 | 7/2011 | Rao | |
| 8,078,096 B2 | 12/2011 | Rao | |
| 8,131,270 B2 | 3/2012 | Rao | |
| 8,135,331 B2 | 3/2012 | Rao | |
| 8,180,276 B2 | 5/2012 | Rao | |
| 8,195,749 B2 | 6/2012 | Rao | |
| 8,270,893 B2 | 9/2012 | Rao | |
| 8,285,196 B2 | 10/2012 | Rao | |
| 8,385,813 B2 | 2/2013 | Rao | |
| 8,433,299 B2 | 4/2013 | Rao | |
| 8,532,713 B2 | 9/2013 | Rao | |
| 8,565,719 B2 | 10/2013 | Rao | |
| 8,583,568 B2 | 11/2013 | Garland et al. | |
| 8,700,015 B2 | 4/2014 | Rao | |
| 8,843,428 B2 | 9/2014 | Golan et al. | |
| 8,898,708 B2 | 11/2014 | Rao | |
| 8,909,587 B2 | 12/2014 | Alush et al. | |
| 9,092,794 B2 | 7/2015 | Rao | |
| 9,100,800 B2 | 8/2015 | Rao | |
| 9,398,450 B2 | 7/2016 | Ludwig et al. | |
| 9,754,313 B2 | 9/2017 | Rao | |
| 10,021,082 B2 | 7/2018 | Lieu et al. | |
| 10,049,085 B2 | 8/2018 | Williams et al. | |
| 2002/0099735 A1* | 7/2002 | Schroeder | G06F 40/151 715/239 |
| 2005/0086587 A1* | 4/2005 | Balz | G06F 40/174 715/221 |
| 2005/0114400 A1 | 5/2005 | Rao | |
| 2008/0085682 A1 | 4/2008 | Rao | |
| 2008/0109278 A1 | 5/2008 | Rao | |
| 2008/0299953 A1 | 12/2008 | Rao | |
| 2009/0187469 A1 | 7/2009 | Smadja et al. | |
| 2009/0187470 A1 | 7/2009 | Smadja et al. | |
| 2009/0307033 A1 | 12/2009 | Pais et al. | |
| 2010/0138260 A1 | 6/2010 | Smadja | |
| 2010/0281355 A1* | 11/2010 | White | G06Q 30/02 715/222 |
| 2011/0125838 A1 | 5/2011 | Rao | |
| 2012/0072261 A1 | 3/2012 | Oberoi et al. | |
| 2012/0116845 A1 | 5/2012 | Warta et al. | |
| 2012/0136696 A1 | 5/2012 | Smadja et al. | |
| 2012/0233644 A1 | 9/2012 | Rao | |
| 2012/0240146 A1 | 9/2012 | Rao | |
| 2013/0046578 A9 | 2/2013 | Rao | |
| 2013/0066681 A1 | 3/2013 | Babila et al. | |
| 2013/0166272 A1* | 6/2013 | Schultz | G06F 11/349 703/23 |
| 2013/0185122 A1 | 7/2013 | Smadja et al. | |
| 2013/0230841 A1 | 9/2013 | Bremer et al. | |
| 2013/0238445 A1 | 9/2013 | Rao | |
| 2013/0298010 A1* | 11/2013 | Rogers | G06F 40/117 715/235 |
| 2014/0038159 A1 | 2/2014 | Rao | |
| 2014/0213227 A1 | 7/2014 | Rao | |
| 2014/0280132 A1* | 9/2014 | Auger | G06F 9/543 707/736 |
| 2015/0051951 A1 | 2/2015 | Cederman-Haysom et al. | |
| 2015/0112737 A1 | 4/2015 | Saunders et al. | |
| 2015/0381759 A1 | 12/2015 | Rao | |
| 2016/0042370 A1 | 2/2016 | Ludwig et al. | |
| 2016/0063515 A1 | 3/2016 | Dzegilenko | |
| 2016/0063524 A1 | 3/2016 | Hornik et al. | |
| 2016/0110741 A1 | 4/2016 | Rao | |
| 2016/0110742 A1 | 4/2016 | Rao | |
| 2016/0110743 A1 | 4/2016 | Rao | |
| 2016/0110756 A1 | 4/2016 | Rao | |
| 2016/0117064 A1 | 4/2016 | Rao | |
| 2016/0117700 A1 | 4/2016 | Rao | |
| 2016/0117701 A1 | 4/2016 | Rao | |
| 2016/0117943 A1 | 4/2016 | Rao | |
| 2016/0119439 A1 | 4/2016 | Rao | |
| 2016/0119765 A1 | 4/2016 | Rao | |
| 2016/0162914 A1 | 6/2016 | Hornik et al. | |
| 2016/0188740 A1 | 6/2016 | Cederman-Haysom et al. | |
| 2016/0299965 A1 | 10/2016 | Starr | |
| 2016/0350771 A1 | 12/2016 | Gardner | |
| 2016/0370954 A1 | 12/2016 | Burningham et al. | |
| 2017/0039988 A1 | 2/2017 | Whiting et al. | |
| 2017/0124174 A1 | 5/2017 | Starr et al. | |
| 2017/0148041 A9* | 5/2017 | Stevens | G06Q 30/0203 |
| 2017/0180494 A1 | 6/2017 | Agrawal et al. | |
| 2017/0206540 A1 | 7/2017 | Oberoi et al. | |
| 2018/0005289 A1 | 1/2018 | Angell et al. | |
| 2018/0032606 A1 | 2/2018 | Tolman et al. | |
| 2018/0040002 A1 | 2/2018 | Tierney et al. | |
| 2018/0040161 A1 | 2/2018 | Tierney et al. | |
| 2018/0041569 A1 | 2/2018 | Smadja et al. | |
| 2018/0060883 A1 | 3/2018 | Cheesman et al. | |
| 2018/0061264 A1 | 3/2018 | Wong et al. | |
| 2018/0089412 A1* | 3/2018 | Kopikare | G06K 9/00006 |
| 2018/0122256 A1* | 5/2018 | Smith | G09B 7/00 |
| 2018/0232752 A1 | 8/2018 | BaderEddin et al. | |
| 2018/0240138 A1 | 8/2018 | Le et al. | |
| 2020/0074294 A1* | 3/2020 | Long | G06N 3/0445 |

OTHER PUBLICATIONS

Clipbookviewer, https://web.archive.org/web/20170831040657/ https://en.wikipedia.org/wiki/ClipBook_Viewer, Aug. 31, 2017 (Year: 2017).*

DCollective: A Configurable Electronic Data Collection Form and Information Dashboard, 2018 (Year: 2018).*

InsideClipboard, https://web.archive.org/web/20180405065723/ https://www.nirsoft.net/utils/inside_clipboard.html, 2018 (Year: 2018).*

* cited by examiner

```xml
<?xml version="1.0" encoding="utf-8"?>
<root>
  <respids>
    <respid id="41052" OLXChannel="1" AgeRange="" Region="1">
      <spot pointX="295" pointY="530" comment="number could be misleading, though it was number of capsules at first (..."/>
      <spot pointX="76" pointY="530" comment="don't really know what this number represents" rating="dislike" order="2"/>
      <spot pointX="290" pointY="617" comment="needs to stand out more" rating="dislike" order="j" hashcode="29061"/>
    </respid>
    <respid id="20371" OLXChannel="1" AgeRange="1" Region="j">
```

FIGURE 16

COMPUTER SYSTEM AND METHOD FOR ELECTRONIC SURVEY PROGRAMMING

TECHNICAL FIELD

The following relates generally to survey and market research automation, and more particularly to a computer system and method for programming an electronic survey.

INTRODUCTION

Companies rely on consumer attitudes and opinions in determining ads, marketing, product development, entering markets etc. Surveys are a convenient way of obtaining data about attitudes and opinions across a sample of a larger population. A single survey is made of at least a sample (or full population in the case of a census), a method of data collection (e.g., a questionnaire) and individual questions or items that become data that can be analyzed statistically. A single survey may focus on different types of topics such as preferences, opinions, behavior, or factual information, depending on its purpose.

Increasingly, the use of electronic surveys, such as those provisioned to respondents online, is becoming more prevalent due to their ability to reach a large number of participants easily, convenient response, and accurate data collection.

It is important that an electronic survey accurately and effectively capture the desired content of the surveyor in order to promote accurate and useful data collection that can lead to meaningful inferences that surveying companies can confidently act on. Survey programmers, who create survey programs for provisioning electronic surveys, play an important role in the process of developing effective electronic surveys based on survey content input.

The survey programming process can be time consuming. This may be particularly true when receiving survey content in a first format and having to translate the survey content into a second format suitable for use in the survey program.

The survey programming process can require many steps. The ability to reduce the time required for survey programmers to perform certain tasks in the electronic survey programming process, and to increase the convenience of such tasks, is desired to provide surveyors with electronic surveys quickly and with minimal errors.

Programming error-free questionnaires helps ensure accuracy in data collection. Researching companies want quick turnaround times on surveys so that they can acquire data, make inferences, and move accordingly in order to secure market advantage. These companies want fast, accurate, and reliable survey programming. Ineffective presentation of the survey content in the electronic survey can be detrimental to the results of the survey and the results and inferences derived therefrom.

Electronic surveys can be a favourable method for collecting data. Questionnaires can be conducted swiftly, without postal delays. Survey participants can choose to remain anonymous and responding is not labour-intensive. Questions may be more detailed, as opposed to the limits of paper or telephones.

Initial setup costs for a customized design of electronic survey may be high due to effort required in programming the questionnaire or survey itself. Thus, getting things right at the time of programming the survey can be important to reduce costs and collecting timely response data. Methods and approaches designed to reduce costs associated with the programming of electronic surveys are desired.

Accordingly, there is a need for improved systems and methods for survey programming that overcome at least some of the disadvantages of existing approaches.

SUMMARY

Provided is a computer system for performing automated market research using an electronic survey. The computer system includes a communications subsystem for: receiving survey content data; and receiving survey response data from at least one respondent device; a memory for storing the survey content data and the survey response data; a processor configured to execute a survey programming application, the survey programming application comprising: a survey design application for creating a survey program from the survey content data, wherein the survey program when executed is configured to: provision the electronic survey to respondents via the at least one respondent device, wherein provisioning the electronic survey includes displaying the electronic survey on the at least one respondent device; and collect the survey response data from the respondents; and at least one survey program quality assurance tool, the survey program quality assurance tool configured to interface with the survey design application and perform a survey program quality assurance function for the creation of the survey program.

The at least one survey programming quality assurance tool may include a clipboard tool for transferring survey content data from a clipboard, wherein the clipboard tool is configured to: analyze clipboard survey content data for typographical emphasis, the clipboard survey content data including survey content data transferred to the clipboard in a first file format; create, automatically, HTML markup for the typographically emphasized text elements in the clipboard survey content data; and transfer the clipboard survey content data including the HTML markup into the survey design application.

The at least one survey programming quality assurance tool may include a survey testing tool for testing the survey program, the survey testing tool comprising at least one of: a navigator module for testing a survey logic of the survey program, the navigator module configured to receive survey position data, retrieve survey content data associated with the survey position data, and output the retrieved survey content data; a derandomize module configured to receive a derandomize indication and survey position data, the survey position data including randomized content, retrieve survey content data associated with the survey position data, and present the randomized survey content of the retrieved survey content data in a derandomized way; a randomly populator module configured to randomly populate the response data in the survey; and a response data clearing module configured to receive a data clearing indicator and clear stored survey response data in response to receiving the data clearing indicator.

The at least one survey programming quality assurance tool may include a data map comparison tool for identifying differences between data maps, the data map comparison tool configured to: compare a first tab delimited file and a second tab delimited file, the first tab delimited file and the second tab delimited file each including survey content data; identify a difference in the survey content data between the first tab delimited file and the second tab delimited file; and generate a comparison output based on the identification.

The comparison may be performed line by line.

The comparison output may include a report table.

The difference may be at least one of a missing question, a missing variable, a non-matching column, a non-matching question text, a non-matching answer text, and a new question.

The at least one survey programming quality assurance tool may include a heat map processing tool for automatically generating heat map point data from input data, the heat map processing tool configured to: receive a data export tab delimited file including respondent data; convert the data export tab delimited file to an XML file; generate a heat map from the XML file; and generate a heat map report based on the heat map. The heat map processing tool may improve efficiency of creation of data used by a heatmap report tool.

The at least one survey programming quality assurance tool may include a programming library tool, wherein the programming library tool comprises a programming library including a plurality of survey programming functions, and wherein the programming library is accessible without leaving a work space of the survey design application. The work space may be a current scripting work space.

The survey programming functions may include at least one of a validation function, a get function, a set function, a check function, a JS/CSS function, a string function, an array function, a quota function, and a custom function.

The secondary application may be a web-based project management application or a customer relationship management application.

The survey content data may be received at the communications subsystem in a first file format and wherein the survey content data is provided to the survey design application in a second file format.

The survey content data may include a questionnaire including a plurality of survey questions.

The survey content data may further include at least one image.

The collected survey response data may be analyzable to provide statistical inferences about a population represented by the respondents.

The survey program may include a survey logic for determining a subset of survey content to provision to the respondent, and wherein the survey logic determines the subset of survey content based on survey response data.

Provided is a method of performing automated market research using an electronic survey. The method includes receiving survey content data; creating a survey program from the survey content data, wherein the survey program, when executed, is configured to: provision the electronic survey to respondents, wherein provisioning the electronic survey includes displaying the electronic survey on at least one respondent device; and collect the survey response data from the respondents; and customizing the survey program using at least one survey programming quality assurance tool, the survey programming quality assurance tool performing a quality assurance function for the creation of the survey program.

The may further include analyzing clipboard survey content data for typographical emphasis, the clipboard survey content data including survey content data transferred to the clipboard in a first file format; creating, automatically, HTML markup for the typographically emphasized text elements in the clipboard survey content data; and transferring the clipboard survey content data including the HTML markup into the survey design application.

The may further include testing the survey program using a survey testing tool, the survey testing tool including at least one of a navigator module, a derandomize module, a random populator module, and a response data clearing module.

The may further include comparing a first tab delimited file and a second tab delimited file, the first tab delimited file and the second tab delimited file each including survey content data; identifying a difference in the survey content data between the first tab delimited file and the second tab delimited file; and generating a comparison output based on the identification.

The may further include receiving a data export tab delimited file; converting the data export tab delimited file to an XML file; generating a heat map from the XML file; and generating a heat map report based on the heat map.

The may further include accessing a programming library including a plurality of survey programming functions, wherein the programming library is accessible without leaving a work space of the survey design application.

The survey content data may be received in a first file format and wherein the survey content data is provided to the survey design application in a second file format.

The survey content data may include a questionnaire including a plurality of survey questions.

The survey content data may include at least one image.

The collected survey response data may be analyzable to provide statistical inferences about a population represented by the respondents.

The survey program may include a survey logic for determining a subset of survey content to provision to the respondent, and wherein the survey logic determines the subset of survey content based on survey response data.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 13 is a graphical interface of a survey programming library tool, according to an embodiment;

FIG. 15 is an example input survey data for a heat map processing tool, according to an embodiment;

FIG. 16 is an example output survey data for a heat map processing tool, according to an embodiment;

DETAILED DESCRIPTION

Figure 1:
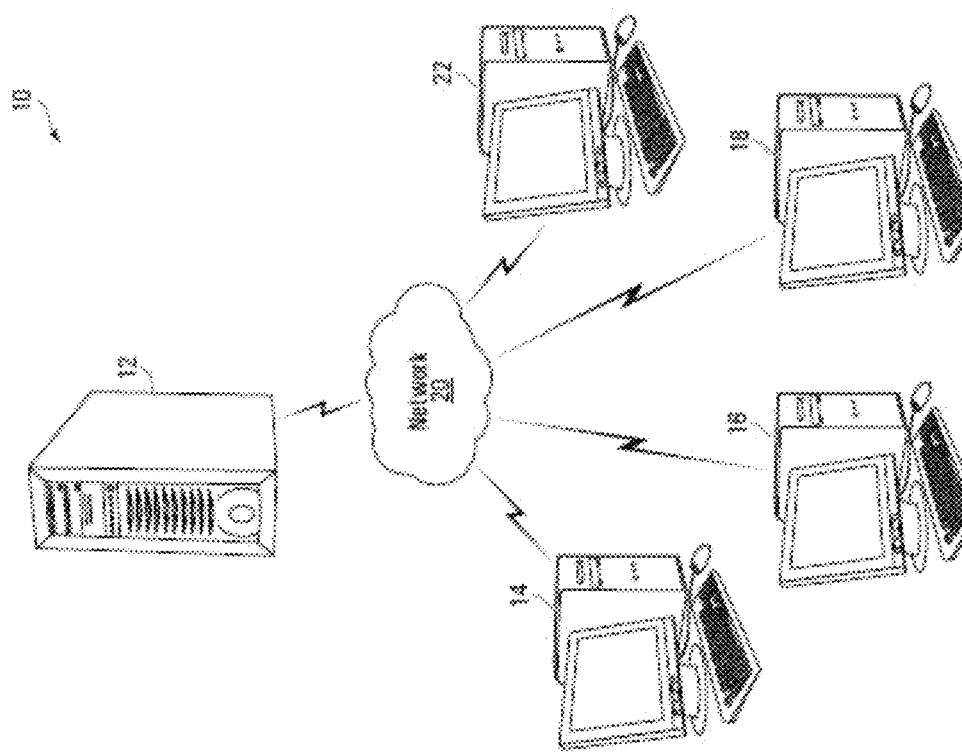
FIG. 1 is a schematic diagram of a system for programming an electronic survey, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The system may improve ability to program and error-free questionnaires to promote accuracy in data collection. The system includes/uses a multi-layer process of survey testing and data checking. The system may provide surveyors with turnaround times that are typically 10 to 20 percent faster than existing approaches. The system may provide fast, accurate, and reliable survey programming. The system may use JavaScript, HTML5, CSS, jQuery and programming components in Flash. The system includes a survey design platform server. The survey design platform server hosts a survey design platform. In an embodiment, the survey design platform is Confirmit™. The survey design platform may provide a stable and secure platform to collect and host the surveyor surveys and data.

The following relates generally to survey and market research automation, and more particularly to a computer system and method for programming an electronic survey.

FIG. 1 shows a block diagram illustrating a system 10, in accordance with an embodiment. The system 10 includes a survey programming server platform 12, which communicates with a plurality of survey programmer devices 16, a plurality of surveyor devices 18, and a plurality of survey respondent devices 22 via a network 20. The system also includes a survey design server platform 14. The survey programming server 12 communicates with the survey design platform 14 via the network 20.

The server platform 12 may be a purpose-built machine designed specifically for creating a computer-executable survey program (also referred to herein as electronic survey) based on survey content from the surveyor devices 18 via the network 20. The survey program, when executed, provisions an electronic survey to the respondents via user interface on the respondent device 22.

The survey program may be an online web-based application. The survey program may be a web-based application executing partially on the server 12 and partially on the respondent device 22. The web-based survey application may promote the respondent to interact with the survey program content (e.g. answer survey questions) using the survey respondent device 22. The survey program may be a webpage (e.g. an HTML based webpage) or a smartphone application. The web application (or webpage) may use a markup language, such as HTML. In an embodiment, the markup language is HTML5.

Survey response data corresponding to selections and input provided by the respondent can be stored at server 12. The stored survey response data can be analyzed statistically in order to provide the surveyor with statistical inferences about the population being studied (i.e. the respondents). For example, survey response data may be sent from the server 12 to the surveyor device 18, where the response data can be analyzed or sent to a third party for analysis. In another case, the survey response data may be analyzed by the server 12 and the results sent to the surveyor device 18.

Survey content data is provided from the surveyor device 18 to the server 12. The transmission of survey content data may occur via network 20. In other embodiments, the survey content data may be provided via an external storage device or the like. The survey content data corresponds to the method of data collection used by the survey. For example, where the method of data collection is a questionnaire, the survey content data includes survey question data.

The survey programmer may create a survey program from the survey content data using the survey programmer device 16. To do so, the survey programmer may access a survey design platform. The survey design platform may be hosted at the survey design server 14 or survey programming server 12. The survey design platform may be a web-based application executing partially on server 12 or 14 and partially on the survey programmer device 16. In other embodiments, the survey design platform may be a desktop application executing on the survey programmer device 16.

The server platforms 12 and 14, and devices 16, 18 and 22 may be a server computer, desktop computer, notebook computer, tablet, PDA, smartphone, or another computing device. The devices 12, 14, 16, 18, 22 may include a connection with the network 20 such as a wired or wireless connection to the Internet. In some cases, the network 20 may include other types of computer or telecommunication networks. The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 20.

Input device may include any device for entering information into device 12, 14, 16, 18, 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

Devices such as server platforms 12 and 14 and devices 16, 18 and 22 can be described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the server platforms 12 and 14. For example, a user using the device 18 may manipulate one or more inputs (e.g. a mouse and a keyboard) to interact with a user interface displayed on a display of the device 18. Generally, the device may receive a user interface from the network 20 (e.g. in the form of a webpage). Alternatively, or in addition, a user interface may be stored locally at a device (e.g. a cache of a webpage or a mobile application).

Server platform 12 may be configured to receive a plurality of information, from each of the plurality of devices 16, 18, 22 and the server 14.

In response to receiving information, the server platform 12 may store the information in storage database. The storage may correspond with secondary storage of the devices 16, 18 and 22 and the server 14. Generally, the storage database may be any suitable storage device such as a hard disk drive, a solid-state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

Figure 2:
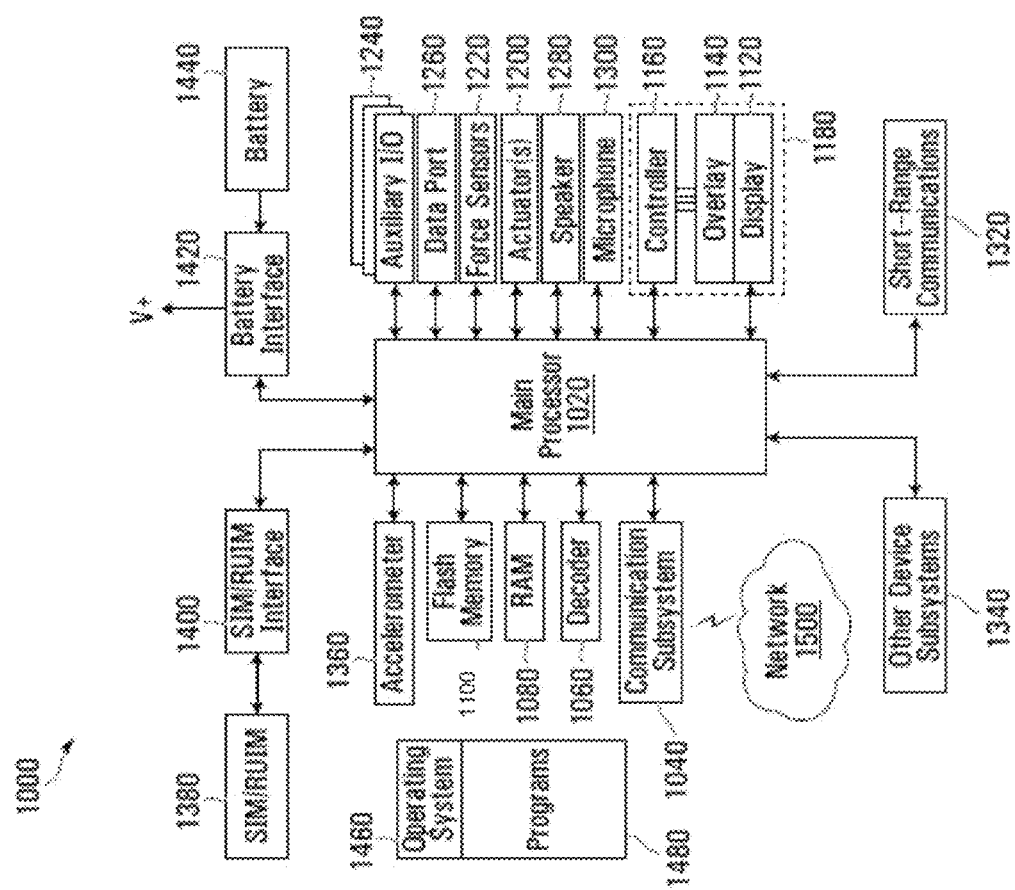
FIG. 2 is a block diagram of a terminal of the system of FIG. 1.

FIG. 2 shows a simplified block diagram of components of a device 1000, such as a mobile device or portable electronic device. The device 1000 can be used to implement one or more computing functions or tasks of the systems and methods of the present disclosure. For example, the device 100 may be device 12, 14, 16, 18, or 22 of FIG. 1. The device 1000 includes multiple components such as a processor 1020 that controls the operations of the device 1000. Communication functions, including data communications, voice communications, or both may be performed through a communication subsystem 1040. Data received by the device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The device 1000 also includes an operating system 1460 and software components 1480 that are executed by the processor 1020 and which may be stored in a persistent data storage device such as the flash memory 1100. Additional applications may be loaded onto the device 1000 through the wireless network 1500, the auxiliary I/O subsystem 1240, the data port 1260, the short-range communications subsystem 1320, or any other suitable device subsystem 1340.

For example, in use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

Referring again to FIG. 1, the survey programmer device 16 is used by a survey programmer to access a survey programming or design platform. The survey programmer uses the survey programming platform to create a survey program using survey content data. The survey program is configured to provision an electronic survey.

The survey design platform may assist the survey programmer in constructing and presenting a questionnaire (or other survey content) in an online format. This may include ordering of questions, scaling, questionnaire formatting, and presentation (e.g. appearance, use of white space, colours, pictures, charts, other graphics, numbering, etc.).

The survey design platform may be a distributed application. The survey design platform may be hosted on the survey programming server 12 or survey design platform server 14.

In another embodiment, the survey design platform may run on the survey programmer device 16. In such a case, the survey programmer may use the survey design platform to create the survey program and then upload the survey program to a survey hosting server (e.g. survey programming server 12) for hosting.

The surveyor device 18 is associated with a surveyor (or researcher). The surveyor may be an entity, such as a company or organization, that wants to collect/obtain information about the attitudes, opinions, or preferences of a population or group. The surveyor may want to engage in market research. The group may be prospective customers. The surveyor may not have the resources or capabilities to create and deliver an electronic survey. The surveyor may want to outsource the creation and delivery of the survey and receive results.

The surveyor device 18 stores survey content data. The survey content data includes survey content. The survey content may be a questionnaire including a plurality of survey questions. The survey content may include images, video clips, other graphical and text elements, etc.

The survey programming server 12 may receive survey content data from the surveyor device 18 via the network 20. In some embodiments, the survey content data may be transferred from the surveyor device 18 to the survey programming server 12 via USB or other suitable data transfer method.

The survey content data may be provided to the survey programming server 12 as an electronic file having a first file format. The electronic file may be a word processing file or text file. The word processing file may be a MICROSOFT WORD file. The electronic file may include text having typographical emphasis such as boldface, underline, italic, or the like.

The survey programming server 12 receives the survey content data. The survey content data is provided to the survey design platform. Through interaction and input from the survey programmer via the survey programmer device 18, the survey content data is used to create the survey program.

The electronic survey facilitates sampling of individual units from a population. The survey program may use one or more techniques of survey data collection, such as a questionnaire. The survey program is configured to collect survey response data from respondents which, when analyzed, may provide the surveyor with statistical inferences about the population being studied.

In an embodiment, the survey program includes a plurality of questions aimed at extracting specific data from a particular group of people. The electronic survey is provided to a sample. The sample includes a plurality of respondents. Preferably, the sample is a representative sample. A representative sample is representative of a larger population of interest. The representative sample can be used to describe the attitudes of the larger population from which the sample of respondents is drawn. The representative sample can also be used to compare attitudes of different populations, or to look for changes in attitudes over time.

Figure 3:
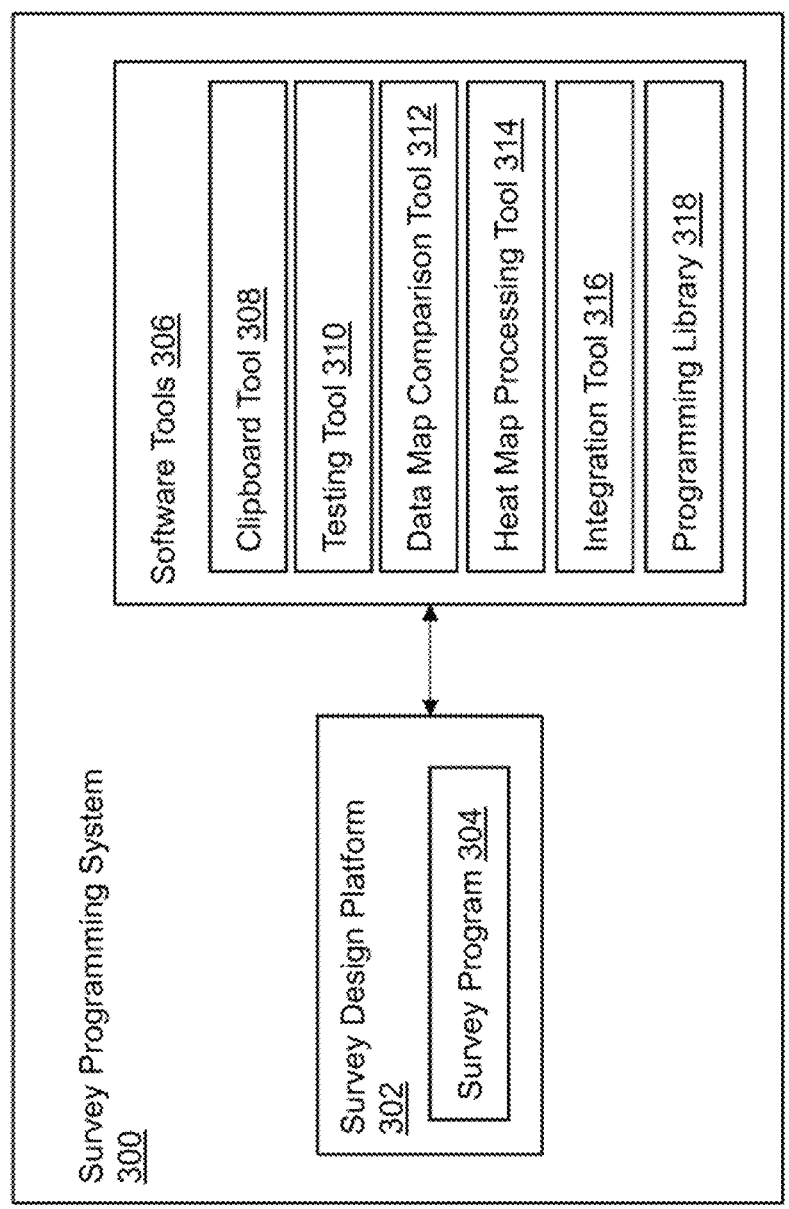
FIG. 3 is a block diagram of a survey programming system, according to an embodiment.

Referring now to FIG. 3, shown therein is a system 300 for programming an electronic survey, according to an embodiment. The system 300 may be implemented using one or more computing devices, such as devices 12, 14, 16, 18, and 22 of FIG. 1. In some cases, various components of and functions performed by the system 300 may be distributed across multiple devices.

A survey programmer can use system 300 to create a survey program (e.g. survey program 304, described below). The survey program may be for use in a market research process.

The survey program implements an electronic survey. The electronic survey may be used for public opinion polls, public health surveys, market research surveys, government surveys, and the like. The survey may focus on different types of topics such as preferences, opinions, behavior, factual information, or the like, depending on the purpose of the survey.

The survey program includes survey content data. The survey content data may include questions and other graphical and textual items (e.g. images). The survey program is configured to receive survey response data from respondents. The survey response data can be stored and analyzed statistically for the benefit of the surveyor.

The survey programming system 300 includes a survey design platform 302. The survey design platform may be hosted by the survey programming server 12 or survey design platform server 14 of FIG. 1. The survey design platform 302 may be a web application. The survey programmer may access the survey design platform 302 as a web application via the survey programmer device 16 of FIG. 1.

The survey programming platform 302 is configured to create a survey program 304. The survey program 304 implements an electronic survey. The survey may be used as a method of quantitative marketing research. The survey program 304 includes survey content.

The survey program 304 may be a computer program that, when executed by a processor (e.g. processor 1020 of FIG. 2), displays the electronic survey (including survey content and other content) via a user interface.

The user interface can be displayed on a respondent device (e.g. respondent device 22 of FIG. 1). The survey program 304 outputs survey content to the respondent and receives survey response data from the respondent as input. The electronic survey content may include questions, images, statements, interactable elements, and the like.

The survey program 304 may include a web application. The survey program 304 may use one or more web pages. The survey program 304 may execute partially on the survey programming server 12 (or other server) and partially on the respondent device 22.

The survey program 304 provides an electronic method of survey response data collection. The survey program 304 may provision the survey via a webpage, such as an HTML-based webpage. In other embodiments, the survey program 304 may provision the electronic survey via another electronic channel such as a smartphone application. Advantageously, provisioning the survey in electronic format via the survey program 304 may include a low ongoing cost and low costs for respondents and surveyors.

The electronic survey may include branching questions. The survey program 304 may dynamically display help or instructions with questions as needed. The survey program 304 may perform automatic sequencing such that the device determines the next question (rather than relying on respondents to correctly follow instructions).

The electronic survey can be provided to survey respondents. The survey program 304 is configured to collect survey response data based on input from the respondent. The survey response data may be used to make inferences about the attitudes, opinions, and preferences of the population represented by the respondent sample.

The survey response data may be stored at the survey programming server 12. Survey response data from a plurality of respondents (i.e. the sample) may be accessed and analyzed.

The system 300 includes a plurality of software tools 306. The software tools 306 include survey programming software tools. The survey programming software tools may provide more effective and efficient programming of surveys using the survey design platform 302.

The software tools 306 include a clipboard tool 308.
The software tools 306 include a testing tool 310.
The software tools 306 include a data map comparison tool 312.
The software tools 306 may include a heat map processing tool 314.
The software tools 306 include a programming library 316.

The software tools 306 include an integration tool 318. The integration tool 318 may not be used with the survey design platform 302. The integration tool 318 does not assist with survey programming. The integration tool 318 may be used to help with a project management invoicing process.

Figure 4:
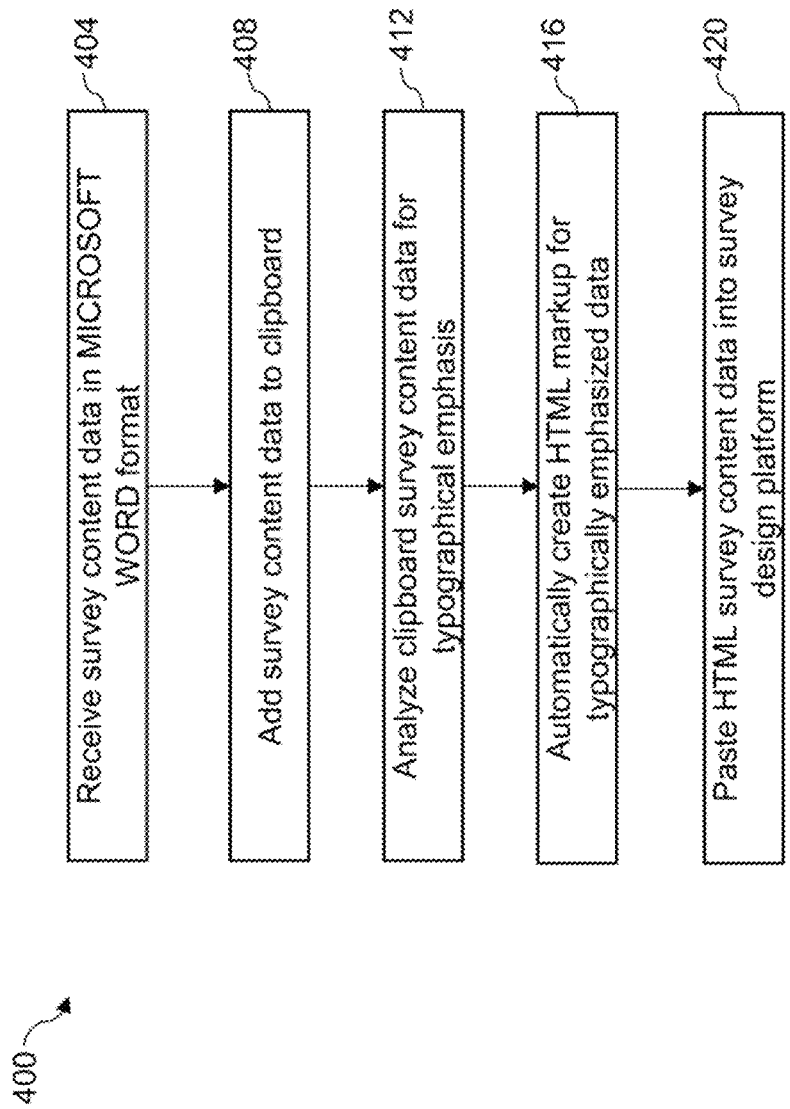
FIG. 4 is a flowchart of a method of transferring survey content data to a survey program, according to an embodiment.

Referring now to FIG. 4, shown therein is a method 400 of transferring survey content data to a survey program, according to an embodiment. The method 400 may be executed by a clipboard tool or module (e.g. clipboard tool 308 of FIG. 3).

The method 400 may be used by system 300 of FIG. 3 to perform a survey programming task. The system 300 includes a clipboard for implementing the method 400. The clipboard is a data buffer used for short-term data storage and/or data transfer between documents or applications used by cut, copy and paste operations. The clipboard may be provided by an operating system (e.g. operating system 1460 of FIG. 2). The clipboard may be implemented as an anonymous, temporary data buffer that can be accessed from most or all programs within the environment via defined programming interfaces.

The survey program 304 includes survey content such as survey questions. The survey content is stored as survey content data. The survey content data may have different formats. In some cases, survey content data is provided to the survey programmer by the surveyor in a first format. The first format may not be compatible with the survey design platform. For example, the survey design platform may require the survey content data to be in a second format. The survey content data in the first format may include typographical emphasis that is not easily transferred into the second format and into the survey design platform. Method 400 assists with this process.

At 404, survey content data is received. The survey content data is in a first file format. The survey content data may be in a word processing file format, such as a MICROSOFT WORD document file. The survey content data includes survey content. The survey content may be survey question, answers, images, etc. The survey content data is provided by a surveyor. The survey content data may be transferred from a surveyor device (e.g. surveyor device X of FIG. 1) to a survey programming server (e.g. server 12 of FIG. 1). The survey content may be transferred via network (e.g. network 20 of FIG. 1). The survey content data may be transferred via other data transfer means.

At 408, the survey content data (or a subset thereof) is added to the clipboard and may be stored as clipboard survey content data. The clipboard survey content data is stored in RAM (e.g. RAM 1080 of FIG. 2). The survey programmer uses this technique to conveniently transfer survey content that is to be included in the electronic survey.

At 412, the clipboard survey content data is analyzed for typographical emphasis. Typographical emphasis may include boldface, underlining, italics, or the like. Typographical emphasis is identified. The system monitors the clipboard data, to monitor for specific windowing encoding of boldface, underlining, italics.

At 416, HTML markup for typographically emphasized text elements in the clip survey content data is created automatically. The specific encoding is converted into an HTML tag. This may reduce the manual conversion of typographical emphasis from window format encoding into html tag. This may reduce the introduction of errors and improve programming efficiency and speed.

The automatically generated content can be stored as HTML survey content data. The HTML markup may be HTML5.

At 420, the HTML survey content data is transferred (e.g. pasted) into a survey design platform (e.g. survey design platform xxx of FIG. 3). The HTML survey content data is used to create the electronic survey that is provided to respondents.

The clipboard tool 308 automates markup for typographical emphasis such as boldface, underline, and italic. Markup may be a symbol or character inserted at certain place in a text file. The markup represents how the file should look (e.g. bold, italic, link, etc.) when the file is printed in a web browser. The markup indicators may be referred to as "tags." Markup refers to a sequence of characters or other symbols inserted at certain places in a text or word processing file to indicate how the file should look when it is printed or displayed or to describe the logical structure of the document.

The clipboard tool 308 may improve efficiency of programming a survey from a questionnaire. Survey content data may include typographical emphasis such as boldface, underline, italic, or the like. Typically, or using existing approaches, the question content data is converted from the first format to the second format manually by the survey programmer. This conversion process may be inefficient and prone to error. The conversion process may produce errors due to the manual conversion performed by the human survey programmer. Under circumstances where the survey content data includes no typographical emphasis, the survey programmer can copy and paste the question content data to the receiving platform in approximately 20 seconds. The inclusion of typographical emphasis in the question content data can increase the time required by the survey programmer to transfer the question content data to the receiving platform (e.g. 3-5 seconds per instance of emphasis) in a manner that will include the appropriate emphasis in HTML markup.

The clipboard tool 308 includes a computer program for monitoring the clipboard. The program automatically creates HTML markup for text with typographical emphasis such as boldface, underline, and italic. By automating certain HTML markup, the clipboard tool 308 may advantageously improve efficiency of the survey programming process. By automating certain HTML markup, the clipboard tool 308 may reduce human error associated with the survey programmer manually transferring survey content data into the survey design platform 302. Such errors may lead to less effective results or lost time by having to correct the errors when discovered.

In an embodiment, the survey programmer can use the clipboard tool 308 by opening the clipboard tool 308 in the background. The survey programmer selects the survey content. The survey programmer copies the survey content to the clipboard (e.g. by using ctrl-c). The clipboard tool 308 converts Microsoft Word formatted survey content into HTML 5 markup formatted survey content. The survey programmer can paste the survey content (e.g. text) from the clipboard (the HTML markup formatted survey content data) into the survey design platform 302.

In an embodiment, the clipboard tool 308 is created using C# programming language.

Figure 5:
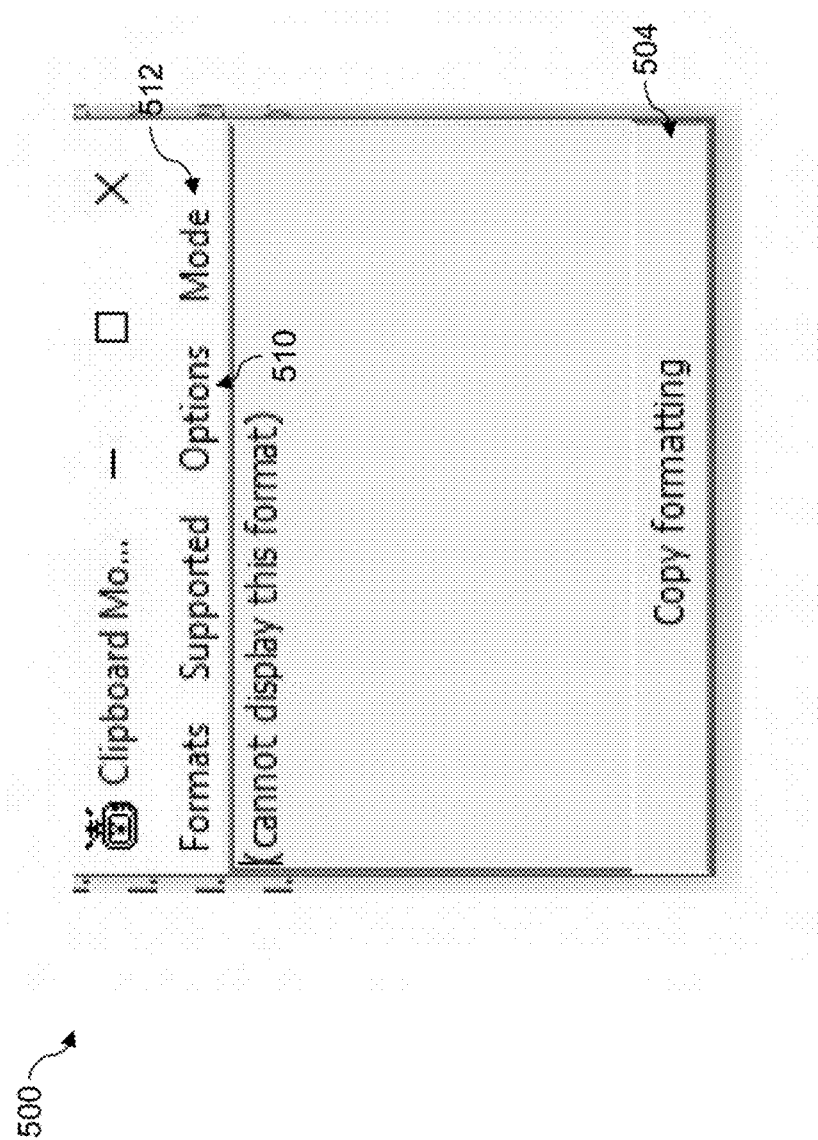
FIG. 5 is a graphical interface of a clipboard tool, according to an embodiment.

Referring now to FIG. 5, shown therein is a screenshot of a graphical interface 500 of a clipboard tool, according to an embodiment.

Figure 6:
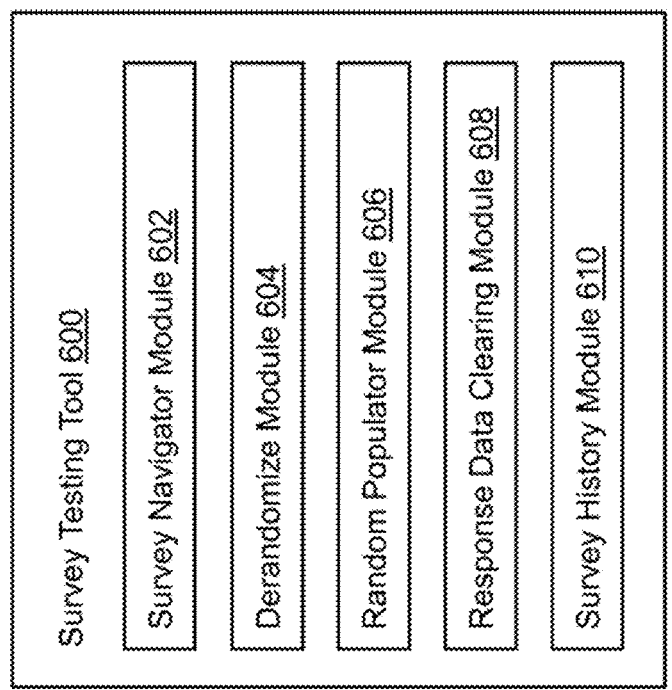
FIG. 6 is a block diagram of a survey testing tool, according to an embodiment.

Referring now to FIG. 6, shown therein is a block diagram of a survey testing software tool 600, according to an embodiment. The survey testing tool 600 may be executed by processor 1020 of FIG. 2. The survey testing tool 600 may be survey testing tool 310 of FIG. 3.

The survey testing tool 600 includes a plurality of modules for implementing features that facilitate testing of the survey. In an embodiment, the survey testing tool 600 uses a GOOGLE CHROME extension.

The survey testing tool 600 may be used by the system 300 as part of the survey programming process.

Once the survey programmer has created the survey program 304 using the survey content data, the survey programmer may test the survey as a respondent. Testing the survey program may help ensure the survey program 304 works as intended and meets the business and technical requirements that have guided the design and development of the survey program 304. The tool 600 may ensure matches with survey content data.

The survey testing tool 600 can be used by the survey programmer to test the survey program 304. The survey testing tool can assist the survey programmer in testing the logic of the survey program 304. The survey programmer can interact with the survey testing tool 600 via a user interface (e.g. user interface 700 of FIG. 7).

Existing approaches for testing survey programs can be slow and inefficient. Testing the logic of the survey program 304 may require a lot of clicking and going back and forward among the survey questions by the survey programmer. These actions can be time consuming and, when performed multiple times, the wasted time can accumulate. For example, testing the logic of the survey program 304 may include jumping to different parts of the survey.

The survey logic may determine what survey content is presented to the respondent. The survey logic may determine that certain survey content should be presented to the respondent based on response data. The response data may be based on input from the respondent such as a response to a question or other action. In an example, the survey logic may provide that certain survey questions are presented to the respondent only if the respondent has made certain selections or provided certain answers to the preceding questions.

The survey program 304 may be configured to, upon receiving data indicating a certain selection by the respondent, "jump" to a particular survey question or survey page. By jumping, it is meant that the survey program 304 receives response data (based on the selection or response of the respondent), analyzes the response data, and determines that a particular survey question (or survey page) should be presented to the respondent. This process may include bypassing other survey questions.

The survey testing tool 600 includes a survey navigator module 602.

The survey navigator module 602 may be used to test the logic of the survey program. The navigator module 602 allows the survey programmer to jump from a first survey position to a second survey position (e.g. question number, page). Under normal operation of the survey program 304 (e.g. when used by a respondent), the first and second survey positions are not sequential and would not be displayed sequentially. For example, using the navigator module 602, the survey programmer may be able jump to any question in the survey.

In an example, the survey programmer may need to make or consider changes to the survey program 304 near the end of the survey (e.g. for a question near the end of the survey). Using existing approaches, the survey programmer may start at the beginning of the survey and work through the survey questions to near the end of the survey where the subject question is positioned in the survey. Such an approach is time consuming for the survey programmer, inconvenient, and involves wasted time.

The navigator module 602 receives survey position data. The survey position data indicates a position in the survey, such as a question number or page number. The survey position data may represent a particular question number in the survey. The received survey position data may be based on user (survey programmer) input. For example, the survey programmer may type a survey position into a text field in the user interface.

The survey position data is associated with survey content data. The survey content data represents the survey content at the survey position. The survey content may include one or more survey questions, text elements, images, or the like.

The navigator module 602 retrieves the survey content data associated with the survey position data. The survey content data is provided to the output interface. The survey content is displayed via the user interface.

The survey testing tool 600 includes a derandomize module 604. The derandomize module 604 is configured to derandomize the presentation/display of certain survey content data. For example, the derandomize module 604 may derandomize answer options for a survey question.

Randomization is a research technique that may be used to help overcome bias that can result from the order in which items (e.g. answer options) are presented to the respondent. When testing the survey program 304, randomization may not be required.

The derandomize module 604 receives a derandomize indication. The derandomize module 604 receives survey position data with the derandomize indication. The survey position data may correspond to a particular survey question or page. The derandomize indication and survey position data are provided by the survey programmer via the survey testing tool user interface.

Upon receiving the derandomize indication and the survey position data, the derandomize module 604 retrieves the survey content data corresponding to the survey position data. After receiving the survey data and receiving the derandomize indication, the derandomize module 604 may reorder the survey response data.

Under normal circumstances, the survey program 304 may include computer executable instructions to randomize at least a portion of the survey content data for the survey position. For example, the survey content data may include a question and a plurality of answer options. The survey program 304 may include code and instructions to randomize the presentation of the answer options in the user interface. In some cases, the survey design platform has functionality to randomize the question answers, which is indicated in the survey content data. Question answers may be randomized in order to mitigate for and/or avoid bias.

The derandomize module 604 derandomizes the survey content data by effectively bypassing the code and instructions for randomizing the survey content data. Survey question answers include a sequential numeric code. Answers are de-randomized based on the sequential numeric code.

The survey testing tool 600 includes a random populator module 606. The randomly populator module 606 is configured to randomly populate the response data in the survey. The testing tool 600 scans for the question type. The question type may be any one or more of a single, multi, grid, openend or numeric input. Randomly populated data reduces the need for the programmer to manually input the data. Randomly populating data may simulate real respondent input.

The random populator module 606 may reduce the number of clicks (or selections) the survey programmer is required to make when testing the survey program 304. In a particular case, the random populator module may reduce the number of selections required by the survey programmer on a grid question. For example, the random populator module 606 may reduce the number of clicks on the grid from 40 clicks to 1 click.

The survey testing tool 600 includes a response data clearing module 608.

The data clearing module 608 receives an indicator. The indicator may be generated in response to a selection made by the survey programmer via the user interface.

Upon receiving the indicator, the data clearing module 608 clears the stored response data. Data is stored in the survey design platform, for single and grid question. A respondent will not be able to clear the answer. With this tool, the programmer can clear the answer and test for possible programming error when no respondent is provided at any given point. Without this tool, the programmer may need to start from beginning to the survey to test the survey.

The survey testing tool includes a survey history module 610. The history module 610 may be useful for when the survey programmer does not remember the question ID of the question. Where surveys re very long, e.g., containing more than 100 questions, the history module 610 makes the survey easy to navigate and go back previous questions.

Figure 7:
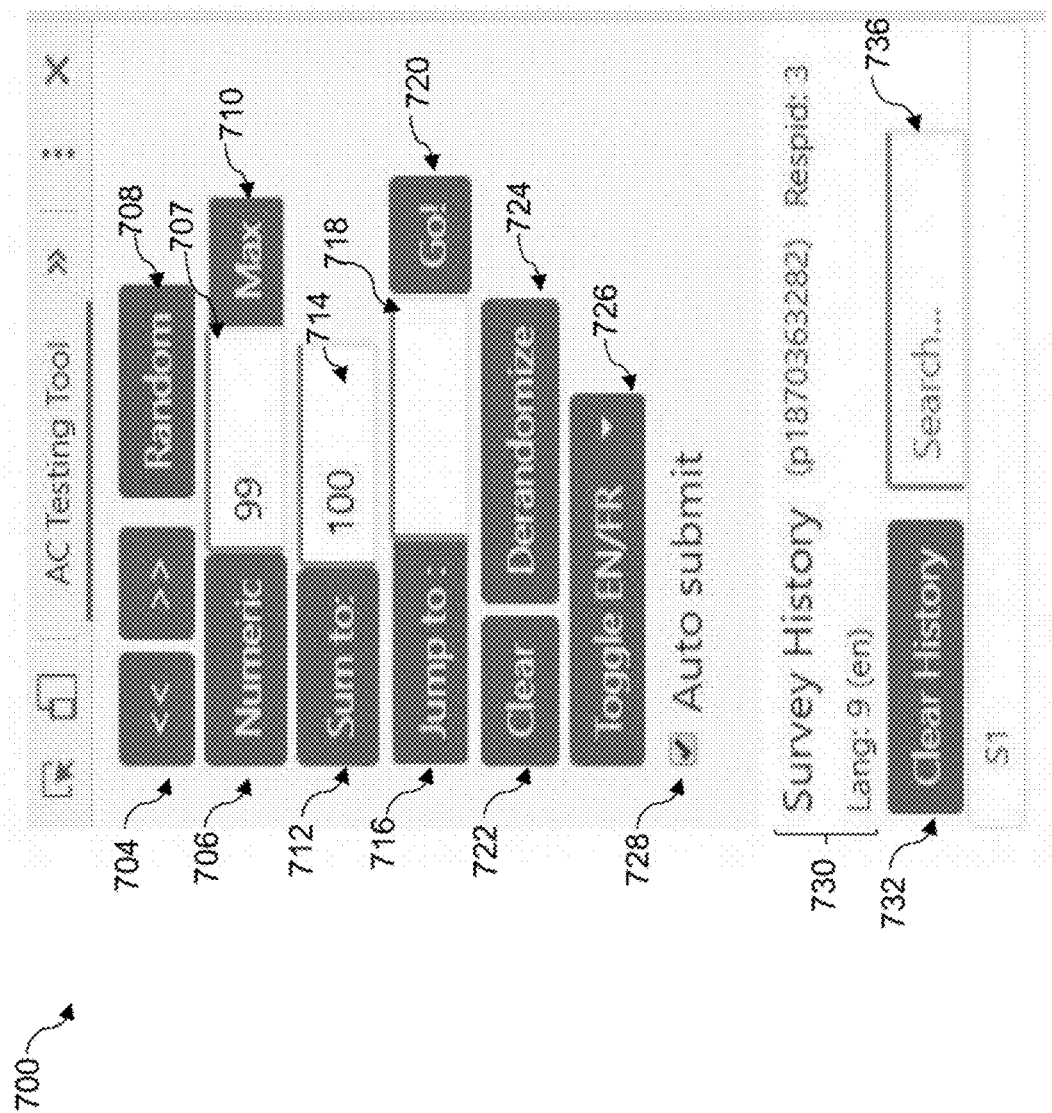
FIG. 7 is a graphical interface of a survey testing tool, according to an embodiment.

Referring now to FIG. 7, shown therein is a screenshot of a graphical interface 700 for the survey testing tool 600, according to an embodiment.

The interface 700 includes text fields and selectable icons that allow for survey programmer interaction with various features and functionalities of the survey testing tool 600.

The interface 700 includes forward and backward navigation icons 704 for allowing the user to find forward and backward buttons at same location.

The interface 700 includes a randomize feature. The randomize feature may be implemented using the random populator module 606 of FIG. 6. The randomize feature includes a randomize icon 708 for helping the programmer to randomly populate answers and improve testing efficiency.

The interface 700 includes a numeric feature. The numeric feature includes a selectable numeric icon 706, a numeric text field 709, and a maximum icon 710. The numeric feature seeds use to randomly populate numeric question. The numeric feature allows answers to be populated within certain range (e.g., between 0 to 10) for certain survey questions.

The interface 700 includes a summing feature. The summing feature includes a summing icon 712 and a summing text field 714. The summing feature allows the programmer to identify whether the values equate to a sum of a certain value. For example, percentages are to sum to 100%. For example, how much of your purchase from store A versus another store. The summing feature may further improve programmer efficiency.

The interface 700 includes a survey position jumping feature. The position jumping feature may be implemented using the survey position jumping module 602 of FIG. 6. The position jumping feature includes a jump to icon 716, a jump to text field 718, and a jump initiator icon 720. The programmer can enter a survey position into the text field 718 and select the jump initiator icon 720. Upon doing so, the survey program 304 jumps to the requested position.

The interface includes 700 includes a clear feature 722. The clear feature 722 clears answers on current question that show the programming during testing. The clear feature 722 is used to test survey logic.

The interface 700 includes a derandomize feature. The derandomize feature may be implemented by the derandomize module 604 of FIG. 6. The derandomize feature includes a derandomize icon 724. With answers, the answer options order should match survey content data, and therefore make the survey easier to test since the derandomized survey would be in same order.

The interface 700 includes a toggle language feature. The toggle language feature allows a user to switch between survey content in different languages. The toggle language feature includes a toggle EN/FR icon 726. By selecting the toggle EN/FR icon 726, the user can switch between English and French survey content (if available). In other embodiments, the toggle language feature facilitates switching between any two languages.

The interface 700 includes an auto submit feature. The auto submit feature includes an auto submit checkbox 728. The auto submit feature auto submits the answer after randomly populating the answer. The auto submit feature may saves extra clicks during testing to improves testing efficiency.

The interface 700 includes a survey history information 730 for identifying the respondent to track and debug the system.

The interface 700 includes a clear history feature. The clear history feature includes a clear history icon 732. Clearing the history may improve the ease of testing very long surveys.

The interface 700 includes a history search feature. The history search feature includes a history search text field 736. The search button helps on specific question lookup.

Figure 8:
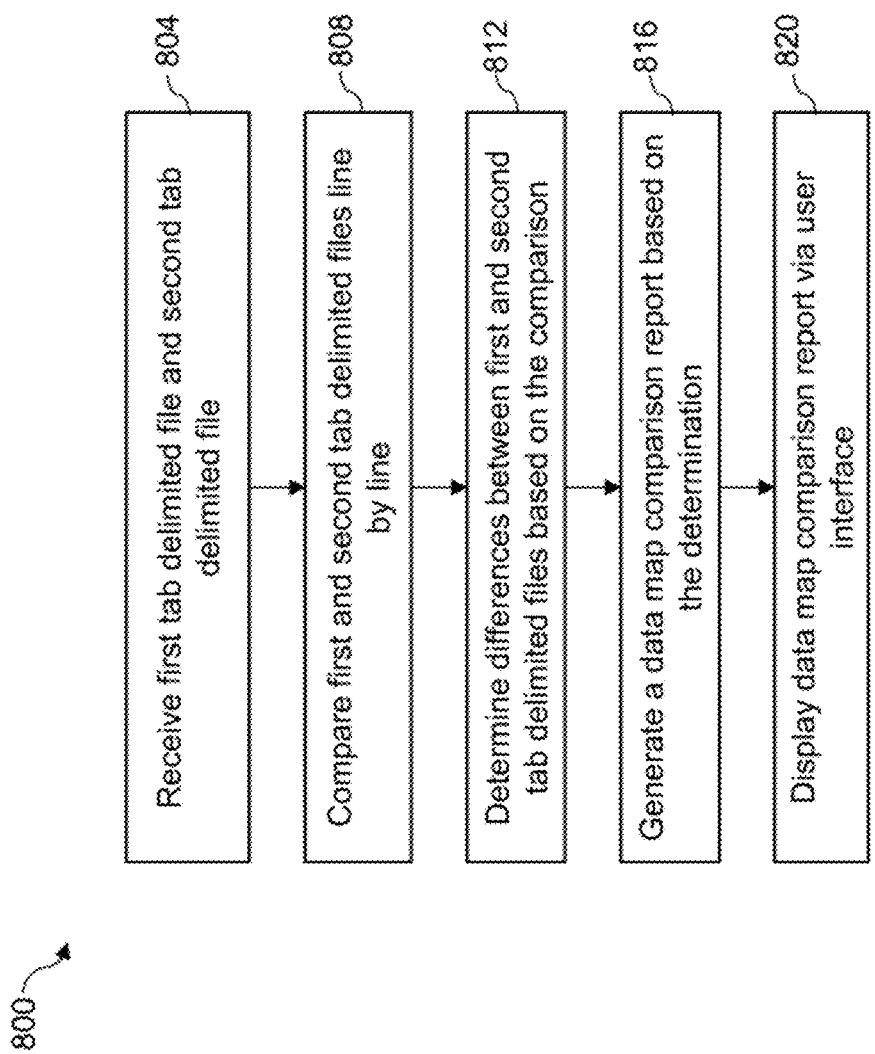
FIG. 8 is a flowchart of a method of survey data map comparison, according to an embodiment.

Referring now to FIG. 8, shown therein is a method 800 for identifying differences between data maps, according to an embodiment. The method 800 may be implemented using the data map comparison software tool 312 of FIG. 3. The method may be used by system 300 of FIG. 3 to perform a survey programming task.

At 804, a first tab delimited file and a second tab delimited file are received. The tab delimited files include survey content data. The survey content data may include a question ID, a variable ID, a type, a start, a finish, a question label, an answer code, an answer label, a level ID, or the like.

At 808, the first tab delimited file and the second tab delimited file are compared. The comparison may be performed line by line.

At 812, differences between the first and second tab delimited files based on the comparison at 808 are determined. Determinations may include identifying missing questions, missing variables, non-matching columns, non-matching question text, non-matching answer text, or new questions. The determination may include identifying the positioning of the differences.

The determination may be provided as a comparison output. The comparison output includes determining the presence of any differences between the first tab delimited file and the second tab delimited file based on the comparison.

At 816, a data map comparison report is generated based on the determination.

Figure 11:
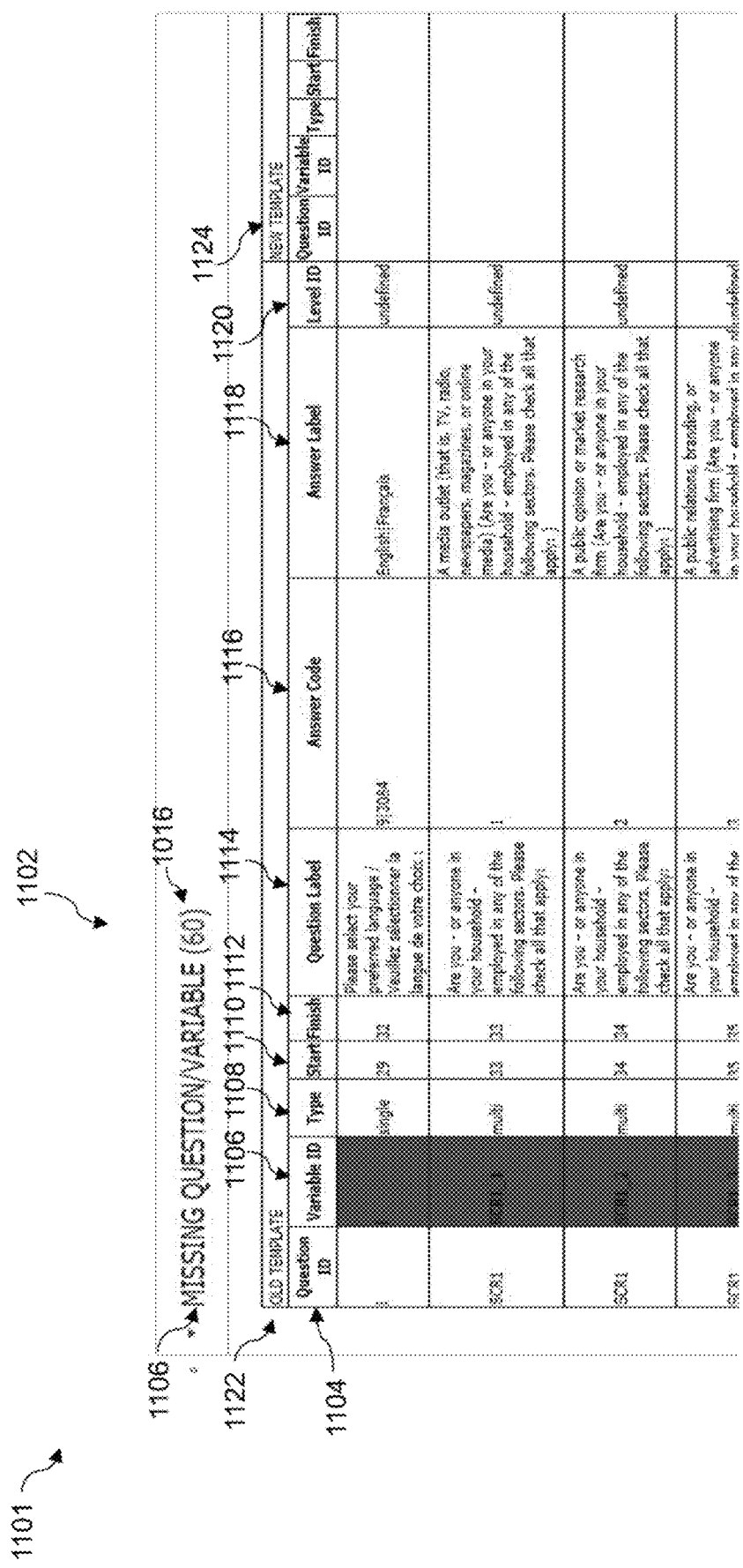
FIG. 11 is a graphical interface of a survey data map comparison tool, according to an embodiment.

At 820, the data map comparison report is displayed via a user interface (e.g. graphical interface 1101 of FIG. 11).

Generating the data map comparison report from the comparison output/results may include highlighting problem data items. Problem data item may be data items that do not match or line up across the first and second files. Highlighted data items can be reviewed or investigated by the survey programmer. Highlighting the data items provides a convenient way of identifying the problem data items.

The problem data items may be highlighted using any suitable indicator for drawing the attention of the report reviewer (e.g. the programmer) to the problem data items. Accordingly, the indicator may be an indicator that contrasts with the non-problem data items. The indicator may be a coloured overlay (e.g. red) that contrasts with other data items. The indicator may be a text indicator or message or other graphical element.

In an embodiment, method 800 may be used in programming a data match study or multi-wave survey. The multi-wave survey may be used to survey the same sample of respondents over a period of time. The multi-wave study includes a plurality waves. At each wave, a survey is delivered to respondents. The survey content may differ between waves. For example, the survey content for a first wave survey may be the same or different from the survey content for a second wave survey.

The multi-wave survey may repeatedly measure the same variables and determine their changes over time. This may include measuring attitudes, awareness, or buying habits or the like. Questions in the multi-wave survey may differ from wave to wave. The questions may be similar but not identical. Questions and categories may be added or removed. For example, if a new brand comes onto the market, the brand can be added to a brand list in the survey in the next wave. Additional questions may be added to subsequent waves for greater customer insight.

When programming a data match study, the survey programmer may compare a first data map from a first wave survey to a second data map from a second wave survey. The first and second data maps may be the first and second tab delimited files of method 800. This may be done to make sure data positions line up across the two wave surveys. This may indicate that investigation should be taken into why there is not a match. The programmer will need to look further for programming issue or confirm with client. This comparison may be performed for any number of waves.

Using an existing approach, a survey programmer may use excel to compare the first and second data maps. In doing so, the programmer checks to see that the data position of questions (or other information) in a first wave survey and the data position of questions in a second wave survey are the same. This comparison can require a lot of programmer time; for example, the comparison task may take 10-45 minutes depending on the size of the study. The Programmer has to manually to use excel to compare the data map which takes around 30 mins to 1 hour depending on the complexity of the study.

The data map comparison tool 312 automates or partially automates the data map comparison process. The data map comparison tool 312 may reduce survey programmer time required to perform the comparison. The data map comparison tool 312 may increase efficiency of the survey programming process. In an example, the data map comparison tool 312 may reduce time required for the programmer to perform the comparison to 15 minutes.

In an embodiment, the data map comparison tool 312 is implemented using HTML5. The data map comparison tool 312 receives the first tab delimited file and the second tab delimited file. The data matching tool 312 reads the first and second tab delimited files. The data matching tool 312 compares the first tab delimited file with the second tab delimited file. The comparison may be performed line by line. The data matching tool 312 determines differences between the first and second tab delimited files based on the comparison. The data matching tool 312 generates a data map comparison report based on the comparison output. The data map comparison report includes the results of the determination by the data matching tool 312. The report is provided to the output interface. The report may be displayed (e.g. to the programmer) via the graphical user interface. The survey programmer can review the data map comparison report to investigate and differences between the files. In an embodiment, the report may be presented in a table format.

Figure 9:
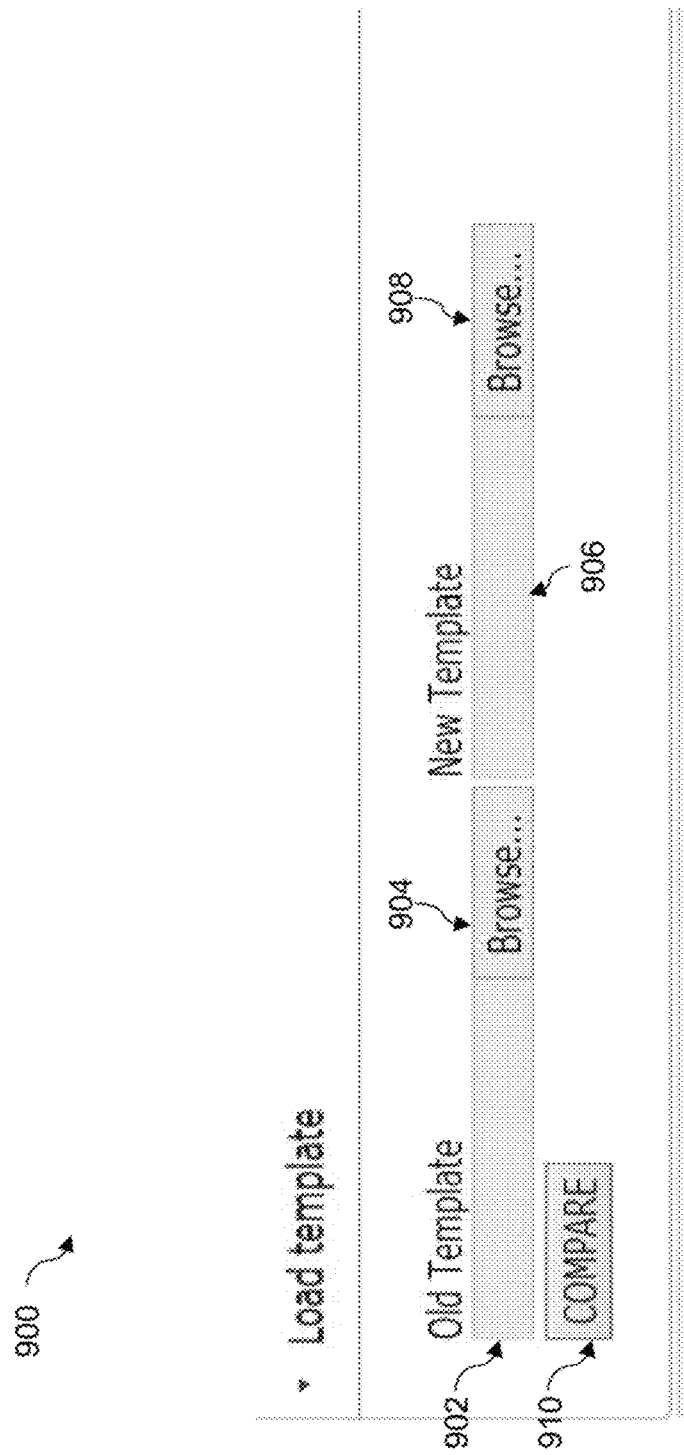
FIG. 9 is a graphical interface of a survey data map comparison tool, according to an embodiment.

Referring now to FIG. 9, shown therein is a screenshot of a graphical interface 900 for the data map comparison tool 312, according to an embodiment. The data map comparison tool 312 can execute the method 800 on a computing device, such as survey programming server 12 of FIG. 1.

The interface 900 includes a first text field 902. The user can enter the name of a first data map template into the first text field 902. The user can select a browse icon 904 to browse available files for the first data map template.

The interface 900 includes a second text field 906. The user can enter the name of a second data map template into the second text field 906. The user can select a browse icon 910 to browse available files for the second data map template.

The interface 900 includes a compare icon 910. The user can select the compare icon 910 to compare the first and second data map templates. Upon selecting compare, the system 300 may carry out steps of the method 800 to perform a comparison of the data maps.

Figure 10:
FIG. 10 is a graphical interface of a survey data map comparison tool, according to an embodiment.

Referring now to FIG. 10, shown therein is a screenshot of a graphical interface 1001 displaying results for a data map comparison process (e.g. method 900), according to an embodiment.

The interface includes a results tab 1002. The results tab may include a drop down function such that when a user selects the results tab 1002, further results information 1004 is displayed.

The further information 1004 may include a plurality of tabs, with each tab corresponding to a type of function. The further information 1004 may include a missing question/variable tab 1006, a columns not matching tab 1008, a question text not matching tab 1010, an answer text not matching tab 1012, and a new questions tab. Each tab may include a results number 1016. The results number 1016 indicates the number of differences of the particular type that were identified by the comparison.

The results tabs 1006, 1008, 1010, 1012, 1014 may include a drop down function such that when the user clicks on a given tab, further information about that tab and the results are displayed. The further information may be a report. The report may be a table.

Referring now to FIG. 11, shown therein is a screenshot of a graphical interface 1101 displaying a report table 1102, according to an embodiment. The report table 1102 is generated by the data map comparison tool 312, for example according to method 900.

The report table 1102 is displayed upon selection of the missing question/variable tab 1006 by the user. In other embodiments, the report table 1102 may be displayed without the need for the user to select the tab 1006 in order to display. While the report table 1102 displays information related to missing questions/variables identified via the data map comparison process, it is understood that a report table (or other representation of information) may be generated for any of the tabs 1006, 1008, 1010, 1012, 1014.

The report table 1102 may include information for the first data map template or the second data map template. For example, the report table 1102 may include a question ID 1104, variable ID 1106, type 1108, start 1110, finish 1112, question label 1114, answer code 1116, answer label 1118, and level ID 1120. The columns are a data map that describes the data structure of the question that is used by the tabulation. The report table 1102 may include information 1104, 1106, 1108, 1112, 1110, 1114, 1116, 1118, and 1120 for a first data map template 1122 and a second data map template 1124.

The report table 1102 may include problem data items depending on the output of the determination by the data map comparison tool. As shown in interface 1001, problem data items are flagged or indicated using a coloured overlay. By flagging the problem data items in the manner, the user can follow up and investigate any problems.

Figure 12:
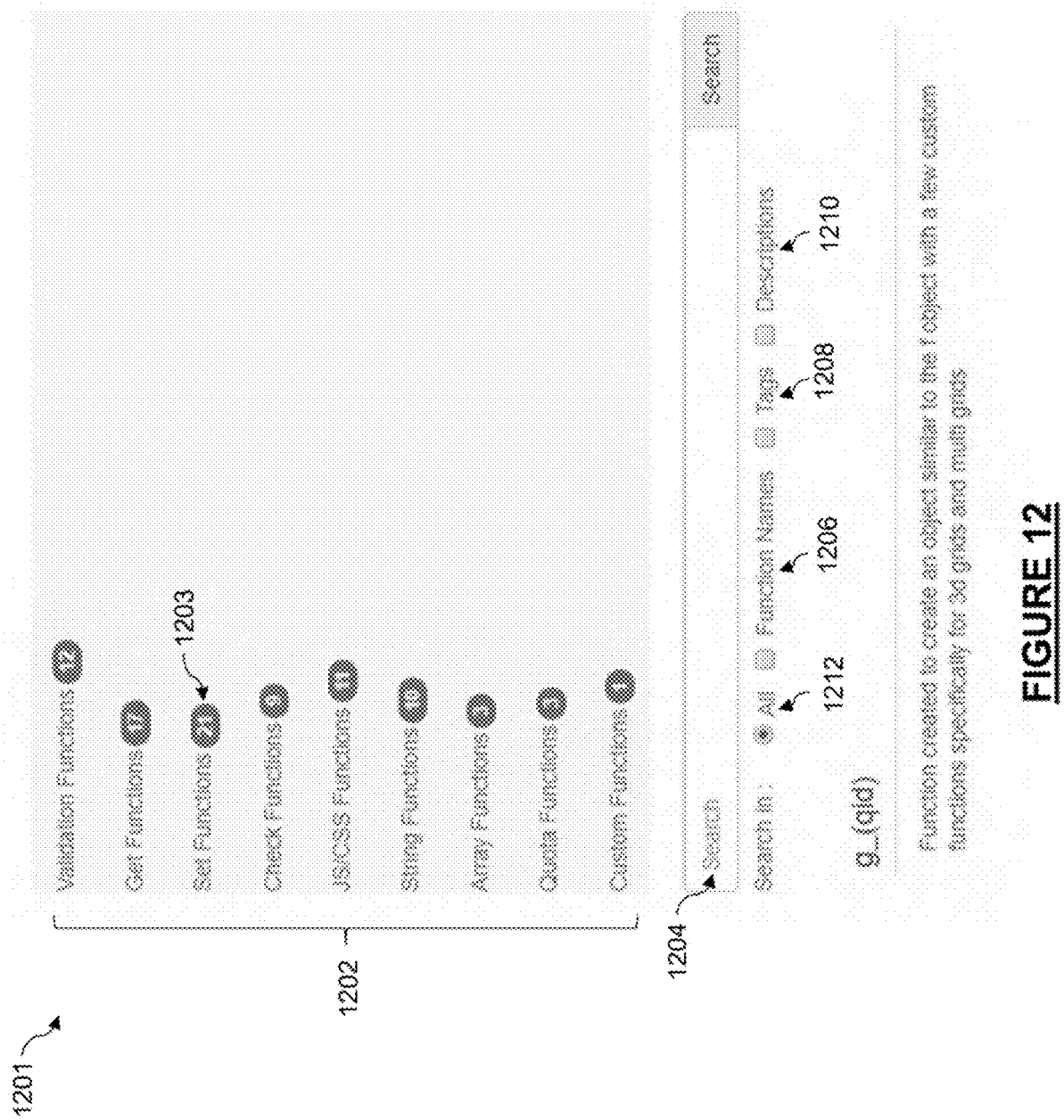
FIG. 12 is a graphical interface of a survey programming library tool, according to an embodiment.

Referring now to FIG. 12, shown therein is a screenshot of a graphical interface 1201 for the programming library software tool 318, according to an embodiment. The graphical interface 1201 may be accessed using the systems of the present disclosure (e.g. system 10 of FIG. 1) and presented to a user on a user device (e.g. user devices 16, 18, 22 of FIG. 1).

The programming library software tool 318 includes a programming library. The programming library can be accessed and used when the survey programmer is using the survey design platform 302 to program the survey.

The programming library may provide a means by which the survey programmer can look up one or more functions for use with the survey design platform 302. The functions may have been created by different survey programmers. Functions created for our survey design platform to speed up the testing and encapsulate the programming method.

Using existing approaches, the survey programmer may have to leave an existing working space of the survey design platform 302 in order to look up a function. The working space is the location or question the programmer is working on. The process of leaving the existing work space, looking up the desired function, and returning to the work space takes time away from the survey programmer (e.g. 30-60 seconds). Further complicating this process, naming and documentation among different functions may not be consistent. For example, inconsistency may occur when different functions are created by different survey programmers.

The programming library may be hosted by an external web application. The programming library includes a plurality of functions 1202 for performing survey programming. The functions 1202 may be grouped by type in the interface 1201. Each group may have a number 1203 associated with it indicating the number of function of that type in the library.

The functions 1202 may include validation functions, get functions, set functions, check functions, JS/CSS functions, string functions, array functions, quota functions, and custom functions.

The functions 1202 include consistent naming and documentation. Advantageously, the programming library tool 318 allows the survey programmer to look up functions without leaving the existing work space. This reduces time required for the survey programmer to search and to program.

The programming library includes function metadata. The function metadata includes function name data, tag data, and function description data.

The programming library is searchable by metadata category. The graphical interface 1201 includes a search tab/function 1204. The interface 1201 includes selectable icons for limiting the search by function name 1206, tag 1208, or description 1210. The interface 1201 includes a "search all" icon 1212 as well.

The survey programmer can search the programming library by function name, tag, or function description (or all). The survey programmer can select a matched function via the input interface (e.g. clicking). The programming library receives the user selection data and returns function documentation.

The programming library tool 318 may increase survey programming efficiency. The programing library tool 318 may increase survey design platform 302 survey programming standardization.

The programming library tool 318 includes the functions with standards. The functions are packaged into the programming library.

The programming library tool 318 stores the documentation of the function externally to the survey design platform 302. Storing the functions externally using the programming library promotes easier and more efficient access. For example, the programmer may have two display monitors, a first monitor for displaying the survey design platform, and a second monitor for displaying a programming library look up. The programmer may be able to quickly switch from one monitor to other, and copy and paste.

The programming library tool 318 includes better standards. The standards are enforced. Standards and enforcement thereof improve efficiency and create better standards. The programming library tool 318 may provide consistent documentation, without leaving existing coding space to improve coding efficiency.

Figure 13:
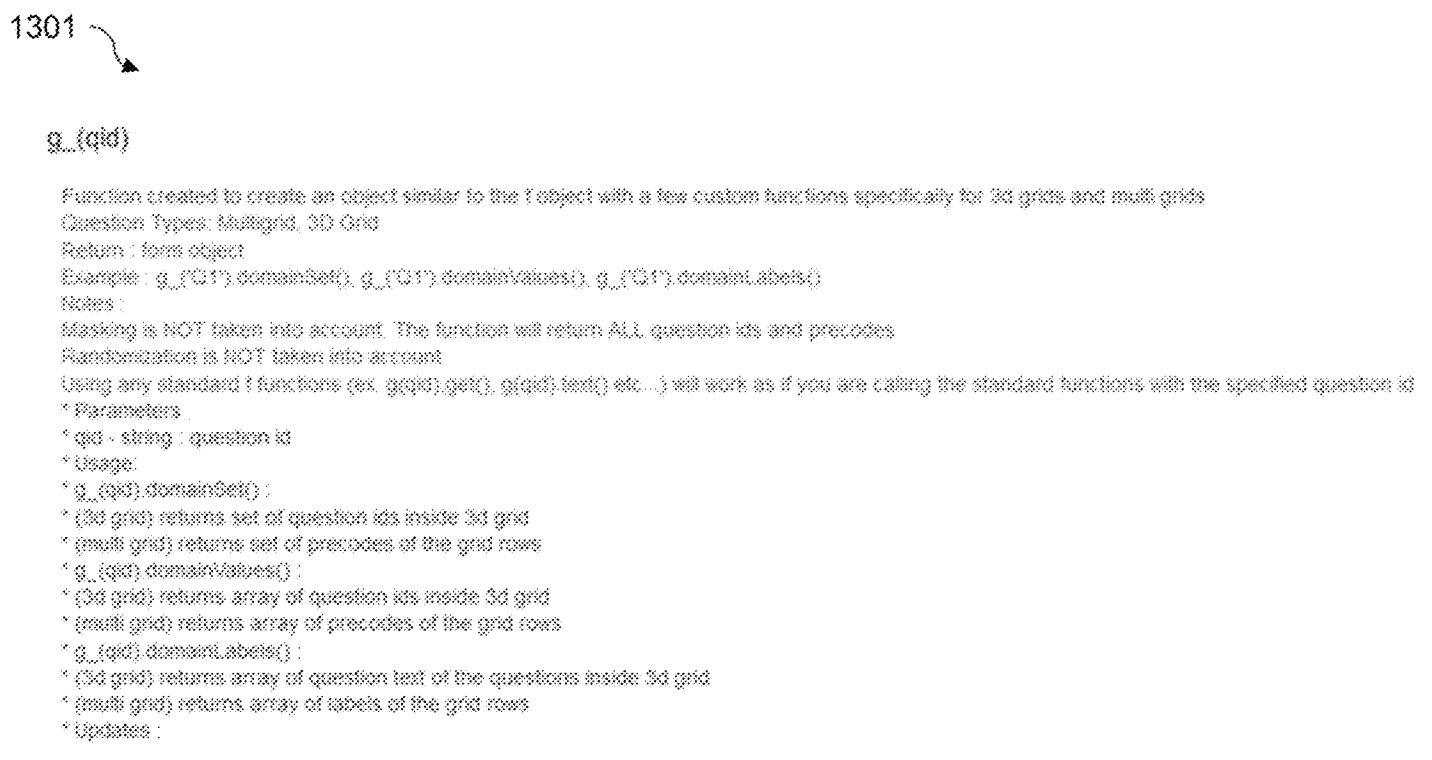

Referring now to FIG. 13, shown therein is a screenshot of a graphical interface 1301 for a programming library tool 318, according to an embodiment. The graphical interface 1301 shows detailed function description and usage.

Figure 14:
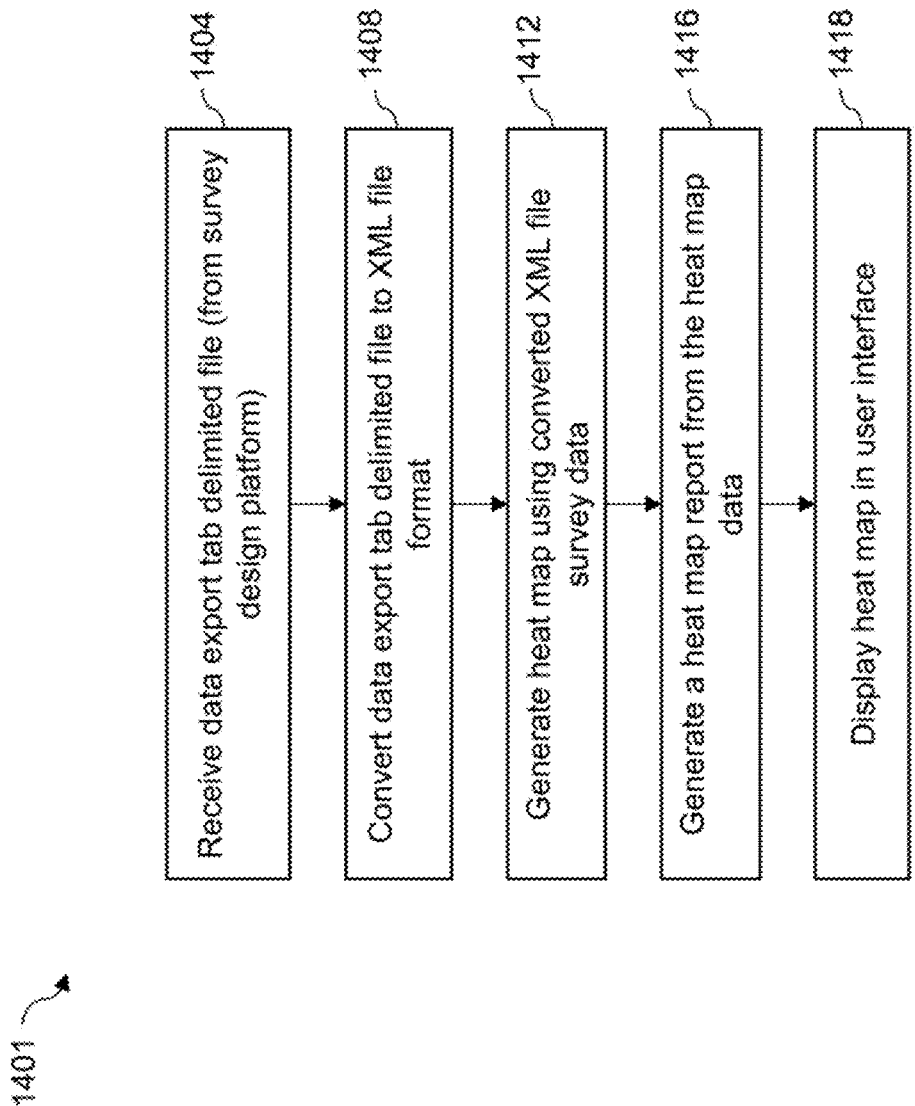
FIG. 14 is a flowchart of a method of survey heat map processing, according to an embodiment.

Referring now to FIG. 14, shown therein is a method 1401 for generating a heat map report, according to an embodiment. The method 1401 may be implemented using the heatmap processing software tool 314 of FIG. 3. The heatmap processing tool 314 is configured to automatically generate heat map point data from input data. The heat map point data is used by a heatmap reporting program. The client user may use the heatmap report for their concept testing question. The heatmap processing tool shows the client the areas where respondents were most engaged.

Using existing approaches, a heatmap report may be prepared manually by a programmer. For example, the survey programmer may manually generate the heatmap report by processing individual files into a format suitable for use by the heatmap report program. The heatmap report processing 314 may require survey data formatted in a particular way so it is usable by the heatmap report program. The input file format may be a data export tab delimited file (e.g. from the survey design platform 302). The output file format may be an XML file format.

The manual processing by the survey programmer may include using MICROSOFT EXCEL (or a similar program). For example, the survey programmer may manually processes a data export tab delimited file to an XML file format. This process can be time consuming for the survey programmer. Depending on the data size and the excel expertise of the survey programmer, this process can take 20-40 minutes to process a single file.

At 1404, a data export tab delimited file is received.

The data export tab delimited file includes survey response data. The data export tab delimited file comprises input data for a conversion module. The tab delimited file includes the rated spot data and respondent data for filtering.

Figure 15:
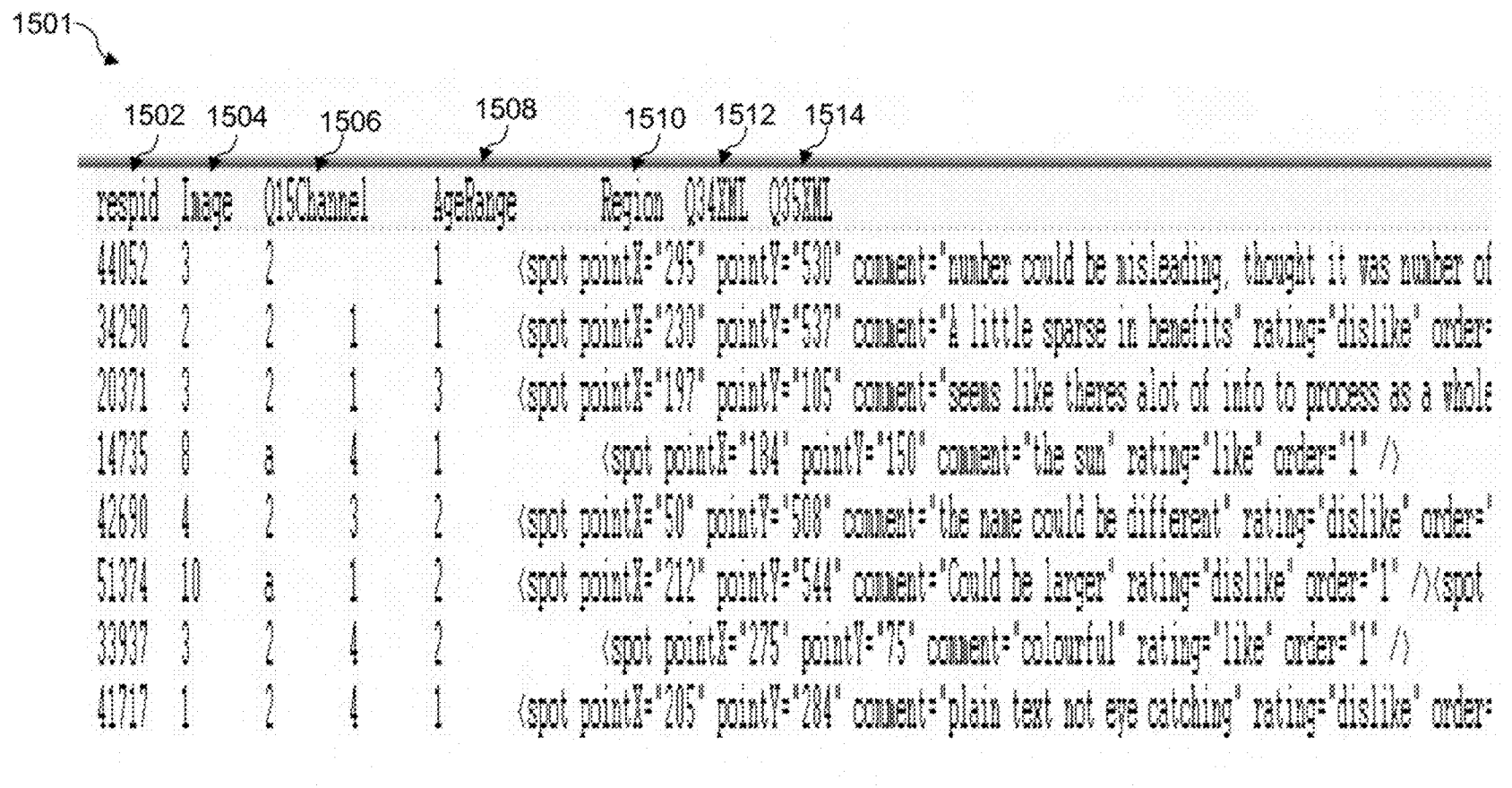

The data export tab delimited file may be provided by the survey design platform 302. A screenshot 1501 of an example input data (data export tab delimited file) for the conversion module is shown in FIG. 15. The significance of information includes respondent identifier 1502, image data 1504, channel data 1506, average data 1508, region data 1510, client request data 1512, and hot spot rated data 1514. The significance of information may vary from project to project depending on client requirement.

At 1408, the data export tab delimited file is converted to an XML file format. The conversion includes a convert tab delimit format into xml file format to describe the data. The data is read line by line from the delimited file and each data point is convert into xml element attributes. The order of the attribute match xml attribute order of the question xml file. The data points stay the same. A screenshot of an example output data (XML file) for the conversion module is shown in FIG. 16.

At 1412, a heat map is generated using the converted XML file survey data as input. The heat map may be generated by a heat map generator module. The heatmap processing tool 314 automatically generates heat map point data from the input data.

At 1416, a heat map report is generated from the heat map data. The heat map data is provided to the heat map report generator module and the heat map. The heat map report generator outputs the heatmap report. The heatmap report program generates the heat map report from the heat map point data.

At 1418, the heat map report is provided to the output interface and displayed via the user interface. The user may review the heat map report using the user interface.

The heat map reporting tool 314 may require input survey data in a particular format so it is usable by the heatmap report. The heatmap report tool may need the survey data in an XML file format.

The method 1401 (and the heatmap processing tool 314) may reduce time required to generate files in a format suitable for the heatmap report tool from an initial incompatible file format. The method 1401 may increase the efficiency of survey programming by reducing the time required by the survey programmer by automating at least a portion of a previously manually performed task. By automating this process, the tool may increase efficiency of the survey programming process (reducing programming time). Further, the tool may reduce errors in the process associated with human error from manual processing performed by the survey programmer. The heat map processing tool 314 and method 1401 may improve efficiency of the survey programming process by reducing time required by the programmer to generate the heat map report. The heat map processing tool 314 and method 1401 may reduce errors in the survey programming process. The heat map processing tool 314 and method 1401 may automate or semi-automate the data generation process.

In an embodiment, the method 1401 may reduce the time required to generate the heat map report program input data file from a range of 20-40 minutes to a range of 5-15 minutes.

In an embodiment, the heat map processing tool 314 may be implemented using C# programming language.

Figure 17:
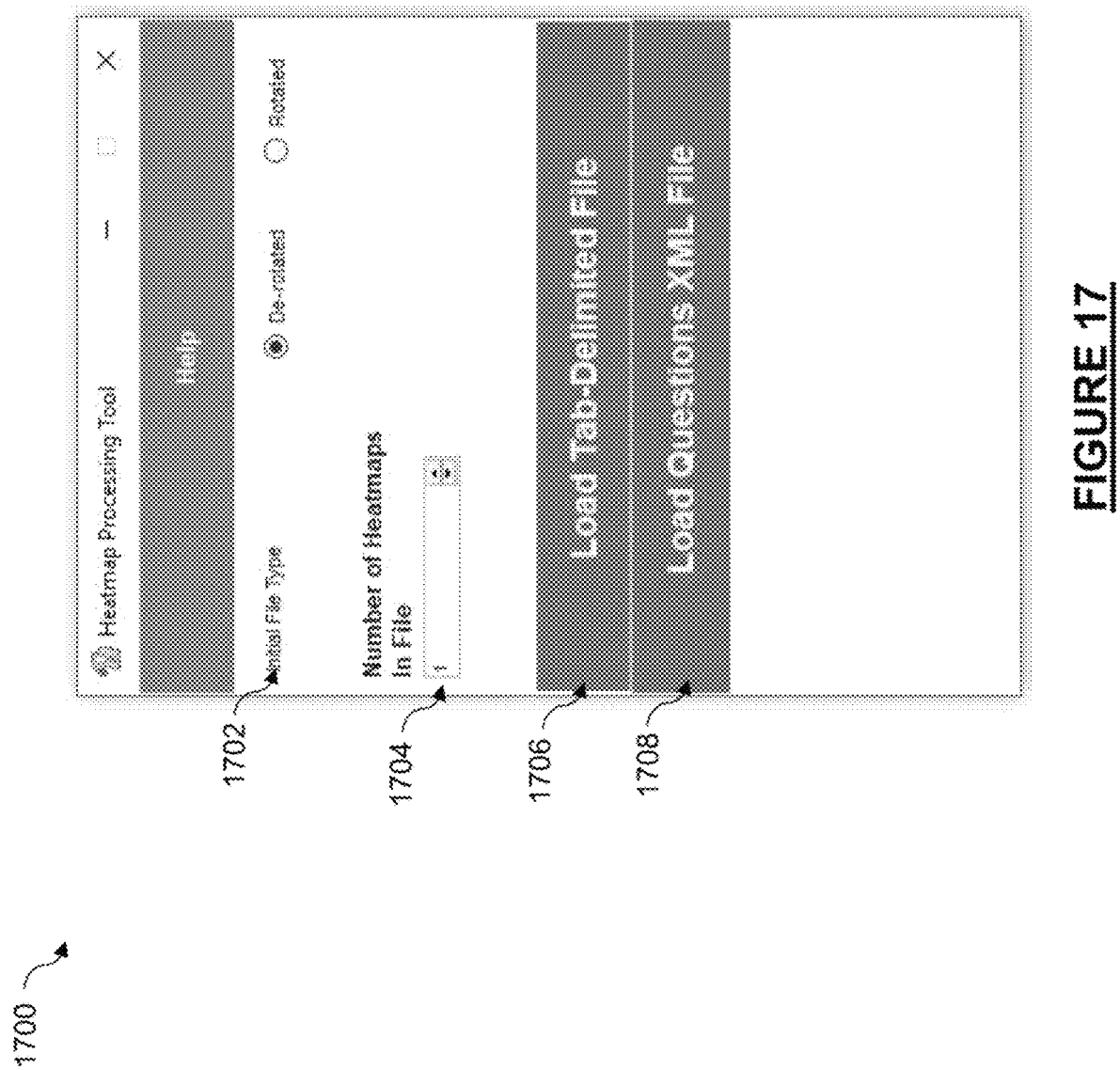
FIG. 17 is a graphical interface of a survey heat map processing tool, according to an embodiment.

Referring now to FIG. 17, shown therein is a screenshot of a graphical interface 1700 for the heat map processing tool 314, according to an embodiment. De-rotated—each rated data column is for one concept only. Rotated data column contains more than 1 concepts. The heat map processing tool 314 includes number of heatmap concept 1704 in the tab delimited file, load tab delimited file or the respondent data file 1706, and xml file 1708 describing the heatmap like filtering, concept image.

Figure 18:
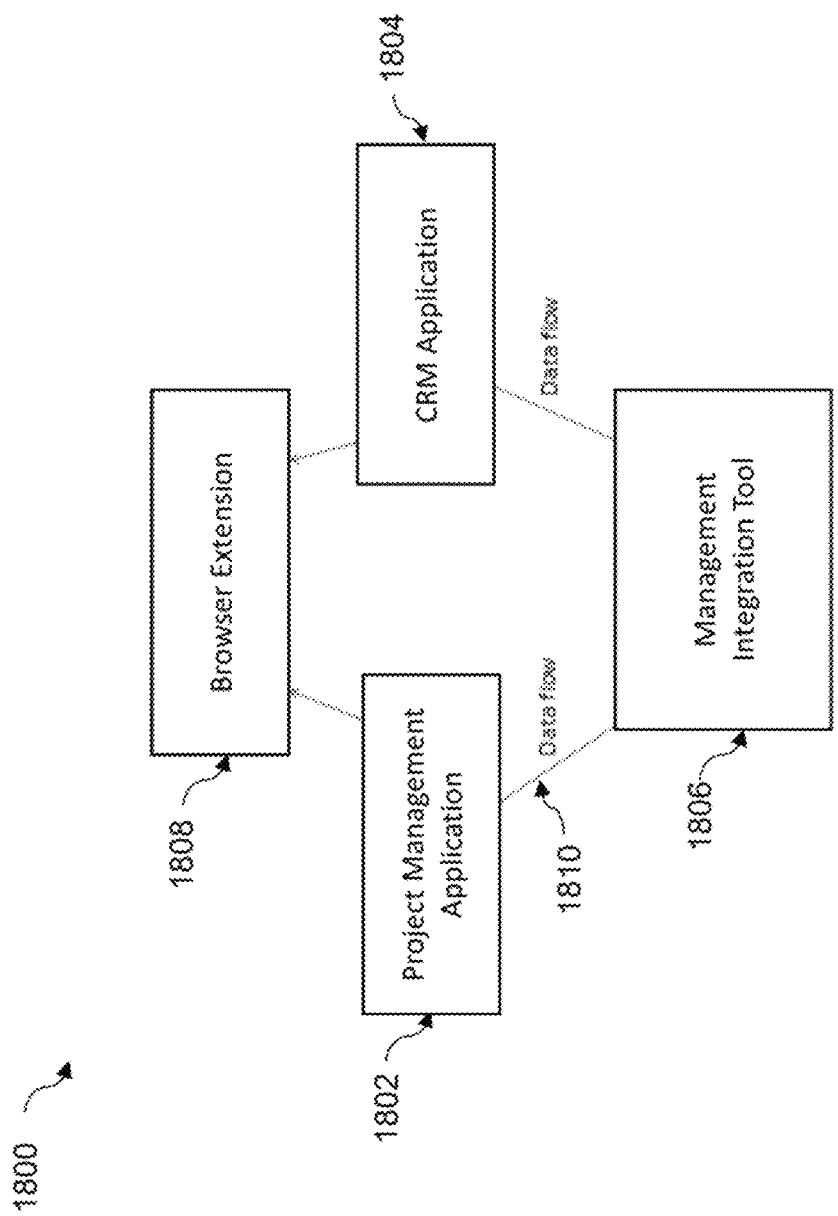
FIG. 18 is a block diagram of an integration tool for use in a survey programming process, according to an embodiment.

Referring now to FIG. 18, shown therein is a block diagram 1800 of an integration software tool 316 for use with the survey programming platform 302, according to an embodiment. The integration software tool 316 is for a project manager to integrate user interface and may include project management invoicing processes.

The integration tool can be used with a secondary application. The secondary application may be a project management application. The project management application may be a web-based project management application such as PRO WORKFLOW. The secondary application may be a customer relationship management application.

The integration tool 316 extends the capability of the project management application to allow custom logic and validation. Currently, integration on the front-end validation logic may not be possible. The integration tool 316 may make front end validation logic possible. Where there is no real time feedback of data push from pro workflow to sales software. The integration tool 316 provides real time feedback on the pushing status. The integration tool 316 provides confirmation to the project manager if data has been pushed back to sales software successfully or not.

The integration tool 316 is configured to integrate a web-based project management application 1802. The web-based project management application 1802 may be PRO WORKFLOW.

The integration tool 316 is configured to integrate a customer relationship management (CRM) platform 1804. The CRM platform may be SALESFORCE.

The integration tool includes a management integration tool 1806 on the backend that controls data flow between workflow software and sales/CRM software. The management integration tool 1806 may provide data mapping; backend to backend communication, and reports. The management integration tool 1806 integrates the project management application 1802 and the CRM application 1804. The integration tool 316 includes a browser extension 1808.

The integration tool includes data flow 1810 between the management integration tool 1806 and the CRM platform 1804 and project management application 1802. The integration tool 316 includes data flow between the browser extension 1808 and the CRM platform 1804 and the project management application 1802. The management integration tool 1806 may provide for invoicing data that flows. The management integration tool 1806 may allow for reporting of programming time into CRM software for invoicing purposes.

The chrome extension 1808 injects custom HTML code into the project management application 1802. The chrome extension 1808 creates a middle layer for handling logistics of data and logic flow 1810 between the chrome extension 1808 and APIs of the project management application 1802 and the CRM application 1804.

While the above description provides examples of one or more apparatus, methods, or systems, it will be appreciated that other apparatus, methods, or systems may be within the scope of the claims as interpreted by one of skill in the art.

The invention claimed is:

1. A computer system for performing automated market research using an electronic multi-wave survey for collecting responses in a plurality of waves including at least a first wave and a second wave, to measure respondent attitudes at two or more different times, the computer system comprising:
 a communications subsystem for:
  receiving multi-wave survey content data, the multi-wave survey content data comprising survey content data associated with the first wave and survey content data associated with the second wave; and
  receiving multi-wave survey response data from at least one respondent device, the multi-wave survey response data including first wave survey response data and second wave survey response data;
 a memory for storing the multi-wave survey content data and the multi-wave survey response data;
 a processor configured to execute a survey programming application, the survey programming application comprising:
  a survey design application for creating a multi-wave survey program from the multi-wave survey content data, wherein the multi-wave survey program when executed is configured to:
   provision the electronic multi-wave survey to respondents via the at least one respondent device, wherein provisioning the electronic multi-wave survey includes:
    displaying the first wave of the electronic multi-wave survey on the at least one respondent device;
    collecting the first wave survey response data from the respondents;
    displaying the second wave of the electronic multi-wave survey on the at least one respondent device; and
    collecting the second wave survey response data from the respondents;
  a survey programming quality assurance tool configured to interface with the survey design application and perform a survey program quality assurance function for the creation of the multi-wave survey program;
 wherein the survey programming quality assurance tool includes:
  a data map comparison tool for identifying differences between data maps, the data map comparison tool configured to:
   compare a first tab delimited file and a second tab delimited file, the first tab delimited file and the second tab delimited file each including multi-wave survey content data, the first tab delimited file and the second tab delimited file associated with the first wave of the electronic multi-wave survey and the second wave of the electronic multi-wave survey, respectively;
   identify a difference in the multi-wave survey content data between the first tab delimited file and the second tab delimited file corresponding to a difference between the first wave of the electronic multi-wave survey and the second wave of the electronic multi-wave survey; and
   generate a comparison output based on the identification;
  a graphical clipboard tool, for transferring multi-wave survey content data from a clipboard, the clipboard comprising a data buffer used by cut, copy and paste operations provided by an operating system, wherein the graphical clipboard tool is configured to:

display current clipboard data buffer contents in a graphical user interface of the graphical clipboard tool;

analyze clipboard multi-wave survey content data for typographical emphasis, the clipboard multi-wave survey content data including multi-wave survey content data transferred to the clipboard in a first file format, the clipboard multi-wave survey content data comprising data associated with the first wave and data associated with the second wave;

create, automatically, computer-readable markup language markup for the typographically emphasized text elements in the clipboard multi-wave survey content data; and transfer the clipboard multi-wave survey content data including the computer-readable markup language markup into the survey design application.

2. The system of claim 1, wherein the survey programming quality assurance tool includes a survey testing tool for testing the multi-wave survey program, the survey testing tool comprising at least one of:

a navigator module for testing a survey logic of the multi-wave survey program, the navigator module configured to receive survey position data, retrieve survey content data associated with the survey position data, and output the retrieved survey content data;

a derandomize module configured to receive a derandomize indication and survey position data, the survey position data including randomized content, retrieve survey content data associated with the survey position data, and present the randomized survey content of the retrieved survey content data in a derandomized way;

a randomly populator module configured to randomly populate the response data in the survey; and a response data clearing module configured to receive a data clearing indicator and clear stored survey response data in response to receiving the data clearing indicator.

3. The system of claim 1, wherein the survey programming quality assurance tool includes a heat map processing tool for automatically generating heat map point data from input data, the heat map processing tool configured to:

receive a data export tab delimited file including respondent data;

convert the data export tab delimited file to an XML file;

generate a heat map from the XML file; and generate a heat map report based on the heat map.

4. The system of claim 1, wherein the survey programming quality assurance tool includes a programming library tool, wherein the programming library tool comprises a programming library including a plurality of survey programming functions, and wherein the programming library is accessible without leaving a work space of the survey design application.

5. The system of claim 4, wherein the survey programming functions includes at least one of a validation function, a get function, a set function, a check function, a JS/CSS function, a string function, an array function, a quota function, and a custom function.

6. The system of claim 4, further comprising a secondary application, wherein the secondary application is a web-based project management application or a customer relationship management application.

7. The system of claim 1, wherein the multi-wave survey content data includes a questionnaire including a plurality of survey questions.

8. The system of claim 1, wherein the collected multi-wave survey response data is analyzable to provide statistical inferences about a population represented by the respondents.

9. The system of claim 1, wherein the multi-wave survey program includes a survey logic for determining a subset of multi-wave survey content to provision to the respondent, and wherein the survey logic determines the subset of survey content based on multi-wave survey response data.

10. A computer implemented method of performing automated market research using an electronic multi-wave survey for collecting responses in a plurality of waves including at least a first wave and a second wave, to measure respondent attitudes at two or more different times, the method comprising:

receiving multi-wave survey content data, the multi-wave survey content data comprising survey content data associated with the first wave and survey content data associated with the second wave;

creating a multi-wave survey program from the multi-wave survey content data for collecting multi-wave survey response data comprising first wave survey response data and second wave survey response data, wherein the multi-wave survey program, when executed, is configured to:

provision the electronic multi-wave survey to respondents, wherein provisioning the electronic multi-wave survey includes:

displaying the first wave of the electronic multi-wave survey on at least one respondent device;

collecting first wave survey response data from the respondents;

displaying the second wave of the electronic multi-wave survey on at least one respondent device; and collecting second wave survey response data from the respondents;

customizing the multi-wave survey program using at least one survey programming quality assurance tool, the survey programming quality assurance tool performing a quality assurance function for the creation of the multi-wave survey program;

analyzing clipboard multi-wave survey content data for typographical emphasis, the clipboard multi-wave survey content data including multi-wave survey content data transferred to a graphical clipboard tool comprising a clipboard, in a first file format, the clipboard comprising a data buffer used by cut, copy and paste operations provided by an operating system, the clipboard multi-wave survey content data comprising data associated with the first wave and data associated with the second wave;

displaying current clipboard data buffer contents in a graphical user interface of the graphical clipboard tool;

creating, automatically, computer-readable markup language markup for the typographically emphasized text elements in the clipboard multi-wave survey content data;

transferring the clipboard multi-wave survey content data including the computer-readable markup language markup into the survey design application;

comparing a first tab delimited file and a second tab delimited file, the first tab delimited file and the second tab delimited file each including multi-wave survey content data, the first tab delimited file and the second tab delimited file associated with the first wave of the electronic multi-wave survey and the second wave of the electronic multi-wave survey, respectively;

identifying a difference in the multi-wave survey content data between the first tab delimited file and the second tab delimited file corresponding to a difference between the first wave of the electronic multi-wave survey and the second wave of the electronic multi-wage survey; and generating a comparison output based on the identification.

11. The method of claim 10, further comprising:

testing the multi-wave survey program using a survey testing tool, the survey testing tool including at least one of a navigator module, a derandomize module, a random populator module, and a response data clearing module.

12. The method of claim 10, further comprising:

receiving a data export tab delimited file;

converting the data export tab delimited file to an XML file;

generating a heat map from the XML file; and generating a heat map report based on the heat map.

13. The method of claim 10, further comprising:

accessing a programming library including a plurality of survey programming functions, wherein the programming library is accessible without leaving a work space of the survey design application.

14. The method of claim 10, wherein the multi-wave survey content data includes a questionnaire including a plurality of survey questions.

15. The method of claim 10, wherein the collected multi-wave survey response data is analyzable to provide statistical inferences about a population represented by the respondents.

16. The method of claim 10, wherein the multi-wave survey program includes a survey logic for determining a subset of multi-wave survey content to provision to the respondent, and wherein the survey logic determines the subset of multi-wave survey content based on multi-wave survey response data.

* * * * *